United States Patent
Arora et al.

(10) Patent No.: US 11,919,718 B1
(45) Date of Patent: Mar. 5, 2024

(54) DEPLOYABLE CONVEYOR MAT ASSEMBLY

(71) Applicant: Amazon Technologies, Inc., Seattle, WA (US)

(72) Inventors: Karan Arora, Seattle, WA (US); Thomas Murphy, Fort Wayne, IN (US); Peter Fischer, Fort Wayne, IN (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/951,752

(22) Filed: Sep. 23, 2022

(51) Int. Cl.
  *B65G 21/14* (2006.01)
  *B65G 13/12* (2006.01)
  *B65G 17/06* (2006.01)
  *B65G 21/10* (2006.01)
  *B65G 21/12* (2006.01)

(52) U.S. Cl.
  CPC ............ *B65G 21/14* (2013.01); *B65G 13/12* (2013.01); *B65G 17/064* (2013.01); *B65G 21/105* (2013.01); *B65G 21/12* (2013.01)

(58) Field of Classification Search
  CPC ...... B65G 21/14; B65G 13/12; B65G 17/064; B65G 21/105; B65G 21/12
  See application file for complete search history.

(56) References Cited

U.S. PATENT DOCUMENTS

| | | | | |
|---|---|---|---|---|
| 3,276,558 A * | 10/1966 | Heinz Guske | ......... | B65G 13/12 193/35 TE |
| 4,852,712 A * | 8/1989 | Best | ....................... | B65G 13/12 414/373 |
| 5,147,025 A * | 9/1992 | Flippo | ..................... | B65G 13/07 198/782 |
| 5,224,584 A * | 7/1993 | Best | ..................... | B65G 47/261 198/782 |
| 5,490,592 A * | 2/1996 | Best | ........................ | B65G 21/14 198/812 |
| 5,632,371 A * | 5/1997 | Best | ........................ | B65G 13/07 193/35 TE |
| 5,636,728 A * | 6/1997 | Best | ........................ | B65G 13/12 198/782 |
| 5,958,240 A * | 9/1999 | Hoel | .................. | B01D 21/2427 210/708 |
| 6,003,658 A * | 12/1999 | Best | ..................... | B65G 41/008 198/588 |
| 6,588,568 B1 * | 7/2003 | Flippo | .................... | B65G 13/12 193/35 TE |

FOREIGN PATENT DOCUMENTS

EP             2354049 A1 * 8/2011 ............. B65G 13/12

* cited by examiner

*Primary Examiner* — Mark A Deuble
(74) *Attorney, Agent, or Firm* — Lee & Hayes P.C.

(57) ABSTRACT

An assembly includes a frame and a conveyor mat configured to transition between a retracted state in which the conveyor mat is disposed within a footprint of the frame, and a deployed state in which the conveyor mat is disposed at least partially disposed outside the footprint of the frame. The conveyor mat has a plurality of linkages, a plurality of rollers, a plurality of supports, and a plurality of axles. Individual axles couple to individual linkages of the plurality of linkages, individual rollers of the plurality of rollers, and individual supports of the plurality of supports together. A tensioning system is configured to control the conveyor mat transitioning between the retracted state and the deployed state.

20 Claims, 26 Drawing Sheets

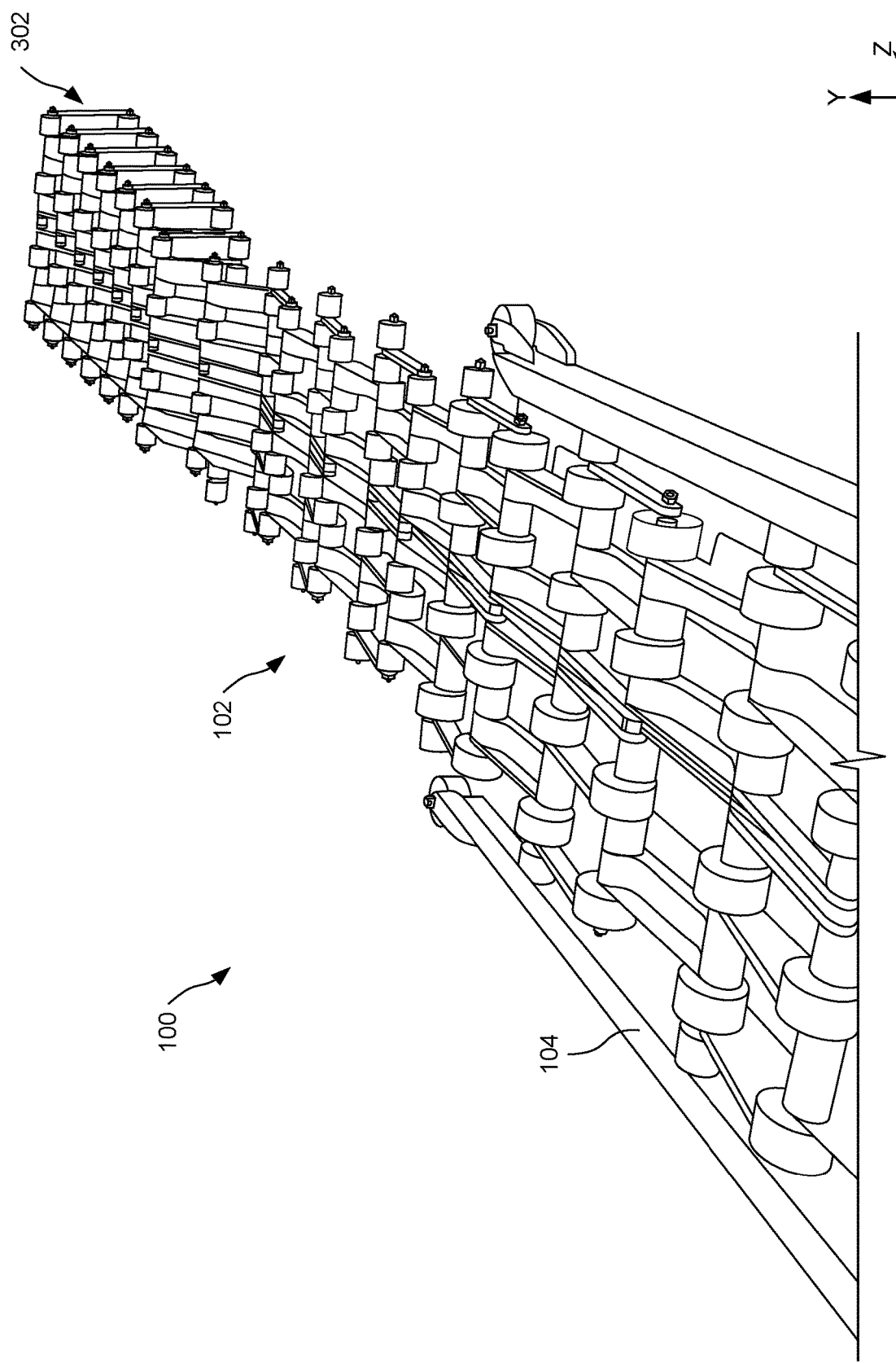

DEPLOYABLE CONVEYOR MAT ASSEMBLY

BACKGROUND

The development of e-commerce has brought about an increase in order fulfillment, shipping, and distribution. As part of this process, once item(s) are packaged for shipment, the packages may be loaded onto vehicles (e.g., vans, trucks, airplanes, unmanned aerial vehicles (UAVs), etc.) for delivery to an end customer. For example, personnel may load the packages onto the vehicles. This may, in some instances, require personnel to enter and exit the vehicle on multiple occasions. Unfortunately, this form of manually loading the vehicles may lead to inefficiencies, injury to the personnel, and/or damage to the packages (or the item(s) contained therein).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The components, devices, and/or apparatuses depicted in the accompanying figures are not to scale and components within the figures may be depicted not to scale with each other.

FIGS. 12A-12C illustrate an example retraction of the conveyor mat of FIG. 1, according to an example of the present disclosure.

DETAILED DESCRIPTION

Figure 1:
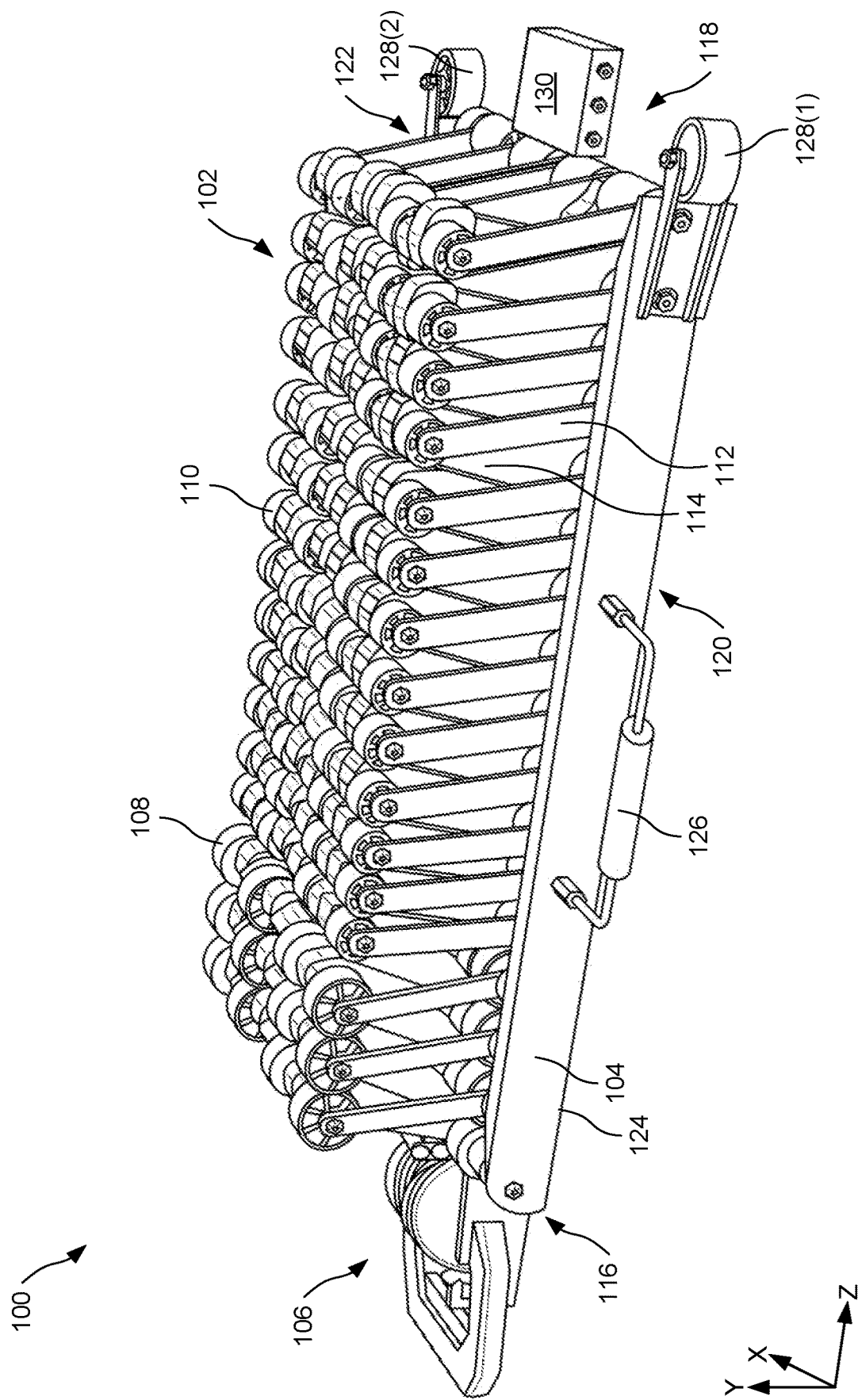
FIG. 1 illustrates a perspective view of an example conveyor mat assembly, showing an example conveyor mat of the conveyor mat assembly in a retracted state, according to an example of the present disclosure.

This application is directed, at least in part, to a conveyor mat assembly that may be used to assist personnel loading packages onto a vehicle. The conveyor mat assembly may include a conveyor mat coupled to a frame and which transitions between a retracted state (e.g., stored) and a deployed state (e.g., extended). In the retracted state, the conveyor mat may compactly fit together within the frame to allow personnel to carry or otherwise transport the conveyor mat assembly. In the deployed state, the conveyor mat may extend from the frame and along a floor of the vehicle to allow packages to be pushed or otherwise slid across the conveyor mat into the vehicle. In some instances, the conveyor mat assembly may include a tensioning system that is used to deploy and/or retract the conveyor mat. For example, in the retracted state, the tensioning system may be activated such that the conveyor mat is extendable. In the deployed state, the tensioning mechanism may be activated to retract the conveyor mat back into the retracted state. The tensioning system may provide a convenient mechanism to allow person to quickly, conveniently, and safely deploy and retract the conveyor mat. The conveyor mat may provide personnel the ability to push multiple packages, or bins containing the packages, into the vehicle to limit an amount of instances that the personnel steps into and out of the vehicle to load the packages.

In some instances, the conveyor mat is formed via a plurality of linkages and supports linked or otherwise coupled together. For example, the linkages and/or the supports may couple together to make up a length and a width of the conveyor mat. In some instances, the conveyor mat may have a length between approximately five feet and twenty feet, and/or a width between five inches and twenty inches. The conveyor mat may have a first end and a second end opposite the second end, where the length extends between the first end and the second end. In the retracted state, the linkages and the supports may fold together and reside within a footprint of the frame. For example, the conveyor mat may be folded such that the first end and the second end are disposed within the footprint of the frame. In the deployed state, the conveyor mat may be unfolded such that the first end may be disposed within the footprint of the frame, while the second end may be disposed external to the frame. For example, the first end (e.g., linkages and/or supports at the first end) may couple to the frame to securely couple the conveyor mat to the frame, while the second end may be capable of extending beyond the frame in the extended state.

In some instances, axles may couple the linkages and supports together in an end-to-end fashion to form the length of the conveyor mat, as well as in a side-by-side fashion to make up a width of the conveyor mat. For example, the linkages and supports may include openings through which the axles are disposed. Across the width of the conveyor mat, the linkages and the supports may be disposed adjacent to one another. Along the length of the conveyor mat, the linkages and the supports may be disposed end-to-end. In this sense, the axles may be disposed along the length of the conveyor mat to couple the linkages and supports together.

Additionally, rollers may be disposed about the axles. In some instances, the rollers are interposed between the linkages and/or the supports on the conveyor mat (e.g., about the axles). Upon deployment, the rollers may provide a platform (e.g., rolling surface) on which the packages are capable of being slid. For example, a package may be placed onto the conveyor mat, on top of the rollers, and slid along the conveyor mat. As the package is slid, the package may slide across the rollers disposed along the length of the conveyor mat.

In some instances, in the deployed state, a bottom surface of the supports may rest on the floor of the vehicle. By resting on the floor, the conveyor mat may be stabilized within the vehicle. The linkages and/or the rollers may be disposed above the floor of the vehicle. The positioning of the rollers above the floor of the vehicle permits the rollers to rotate (e.g., freewheel) such that the package may be slid across the conveyor mat. However, it is envisioned that while the conveyor mat is deployed in the vehicle, personnel may accidently or intentionally step onto portions of the conveyor mat in order to place the packages on shelves and/or at certain areas within the vehicle. Here, the rollers may be compressible upon application of a certain amount of force. For example, the axles may be disposed through the supports, within a slot, and may include a range of vertical translation. Coil springs may engage with the axles at a location within the slot. The coil springs extend the axles to a first end of the slot (e.g., top most position in slot). When a certain amount of weight is applied to the rollers, this weight is imparted to the axles and as a result, the coil springs may be compressed to extend the axles to a second end of the slot (e.g., bottom most position in slot). As the rollers are coupled about the axles, movement of the axles to the second position may cause the rollers to translate in a direction towards and engage with the floor of the vehicle. The engagement between the rollers and the floor may prevent the rollers from moving, thereby allowing the personnel to safety step on the conveyor mat with a reduced risk of slipping. As such, the personnel may step on the rollers.

Additionally, given the coupling between the axle and the linkages, during movement of the axles, the linkages may correspondingly move. In some instances, the linkage may contact the floor of the vehicle. Upon removal of the force, the coil springs extend the axles towards the first end of the slot such that the rollers and linkages translate away from the floor of the vehicle. In doing so, the rollers provide the rolling surface on which the package is slid. Each of the axles, rollers, and linkages may be independently biased depending on the placement of the weight on the conveyor mat. Further, the coil springs may be designed (e.g., spring constant) to compress under a weight of the personnel, but not of the packages in order to avoid an unintentional compression of the coil springs during loading of the packages.

In some instances, the tensioning system includes a cord, a locking mechanism operably engaged with the cord, and a handle and spool. The locking mechanism may represent a pair of the offset cam locks that engage with the cord (e.g., rope, wire, cable, etc.) and which prevent the conveyor mat transitioning to the deployed state. For example, the cord may route between the pair of offset cam locks, to prevent unreeling of the cord from the spool. The spool rotationality couples to the handle, and the spool is permitted to reel within the handle to wind the cord around the spool and unwind the cord from the spool. For example, the cord may be wound about the spool, and an opposite end of the cord not coupled to the spool may couple to the second end of the conveyor mat (e.g., to a linkage, support, and/or axle at the second end).

In a resting state, the locking mechanism is engaged with the cord to prevent the conveyor mat deploying. However, the locking mechanism is capable of being actuated (e.g., via a lever, button, switch, etc.) to disengage with the cord and permit the cord to unwind from the spool and allow the conveyor mat to transition to the deployed state. For example, actuating the locking mechanism may move the offset cam lock(s) apart from one another, and allow the cord to unwind from the reel to transition the conveyor mat to the deployed state. Transitioning of the conveyor mat to the deployed state may be accomplished, at least in part, by biasing members, such as torsional springs, that are wound about the axles and which couple to the supports. The torsional springs impart a force to the supports necessary to deploy the conveyor mat. For example, in the retracted state, the torsional springs may be in a twisted position (e.g., wound about the axles with ends pressing against the supports). When the locking mechanism is disengaged with the cord, the torsional springs are permitted to untwist and a biasing force presses against the supports to deploy the conveyor mat. However, when the locking mechanism is engaged with the cord, the locking mechanism engages (e.g., grips, pinches, etc.) the cord to restrict the conveyor mat being deployed. In this sense, the locking mechanism holds the cord and counteracts the force of the torsional springs wanting to deploy the conveyor mat. As such, when the locking mechanism disengages the cord, the force of the torsional springs is released and allowed to deploy the conveyor mat. In other words, when the supports are in the folded position during the retracted state, the torsional springs bias the supports to an unfolded position to deploy the conveyor mat. When the conveyor mat is retracted, the torsional springs are twisted to store mechanical energy necessary during a deployment of the conveyor mat and when the locking mechanism is released. The torsional springs may therefore automatically deploy the conveyor mat across the vehicle when the locking mechanism is released.

In some instances, the conveyor mat may include different types of torsional springs that impart different amounts of torque along the length of the conveyor mat. For example, a first portion of the length of the conveyor mat, or a first number of the supports, may engage with first torsional springs having a first amount of torque or a first spring constant (e.g., twelve pounds of torque). A second portion of the length of the conveyor mat, or a second number of the supports, may engage with second torsional springs having a second amount of torque or a second spring constant that is less than the first amount of torque or the first spring constant (e.g., ten pounds of torque). A third portion of the length of the conveyor mat, or a third number of the supports, may engage with third torsional springs having a third amount of torque or a third spring constant that is less than the second amount of torque or the second spring constant (e.g., seven pounds of torque). The first portion of the length may be disposed at the first end of the conveyor mat (e.g., extending from the first end towards the second end), the third portion of the length may be disposed at the second end of the conveyor mat (e.g., extending from the second end towards the first end), and the second portion of the length may be disposed between the first portion of the length and the second portion of the length.

The handle may include a lever that, when actuated, locks or otherwise prevents rotation of the spool. For example, to retract the conveyor mat, the personnel may pull on the handle while pressing the lever. The pressing of the lever prevents rotation of the spool (e.g., restricts the spool freewheeling). During pulling of the handle, with the lever engaged, the cord slides past the locking mechanism. Releasing the lever allows the spool to coil the cord (e.g., slack in the cord between the locking mechanism and the spool). For example, a torsional spring in the handle, and engaged with the spool, may wind the cord around the spool. This process may repeat to fully retract the cord. For example, after coiling a first length of the cord, the personnel may again pull on the handle while pressing the lever. As pressing the lever prevents rotation of the spool the cord is pushed past the locking mechanism. During this instance, however, upon releasing the handle, the locking mechanism prevents the cord sliding past the locking mechanism (e.g., counteracts the force of the torsional springs). Therein, the lever on the handle may be released and the spool may coil the cord (e.g., slack in the cord between the locking mechanism and the spool). Pulling on the cord, with the lever engaged, and while the spool is locked, overcomes the torque applied by the torsional springs. In some instances, the conveyor mat may be retracted and/or deployed while the personnel resides external to the vehicle (e.g., standing behind the loading door of the vehicle).

The linkages and the supports of the conveyor mat may fold, in an accordion like fashion, into the frame. The frame has channels, tracks, etc. that receive the rollers and which help guide the linkages, supports, axles, and/or rollers into and out of frame. For example, the frame may include two tracks that oppose one another, on a left side and a right side of the frame. The width of the conveyor mat is configured to reside between the two tracks. In some instances, guides (e.g., wheels) are included on ends of the tracks to guide the linkages, the supports, the axles, and/or the rollers into channels of the frame.

In some instances, in the deployed state, a portion of the length of the conveyor mat resides within the frame. Here, a portion of the rollers that reside within the frame may include rollers having a larger diameter that those disposed external to the frame in order to extend beyond an upper periphery of the tracks to provide the platform on which the packages are slid.

In some instances, the frame includes a flange that engages with the vehicle floor, or a lip of the vehicle floor. For example, at a loading gate of the vehicle, the flange may engage with the lip of the vehicle floor. Such engagement may prevent the conveyor mat (or the conveyor mat assembly, such as the frame) sliding into the vehicle, whether during deployment or as the personnel is using the conveyor mat to load packages into the vehicle. Cushioning may be include on the flange to prevent damage to the vehicle, such as to the lip of the vehicle floor in which the flange engages. A bottom of the frame that rests on the vehicle floor may include pads, or other gripping elements, such as rubber pads to increase friction between the conveyor mat assembly and the vehicle floor. In some instances, the frame may include cutouts (e.g., voids) to reduce a weight of the frame.

Additionally, in some instances, the second end of the conveyor mat may include a pedal that is used to at least partially retract the conveyor mat. For example, the personnel may step on the pedal or push the pedal to advance the conveyor mat in a direction towards the first end. In some instances, pushing the pedal may not retract the cord onto the spool. Instead, pushing the pedal may overcome torque applied by the torsional springs within the third portion of the length of the conveyor mat. Furthermore, when the third portion of the length is retracted, the third portion of the length may remain in the retracted position until the conveyor mat is extended (e.g., via the personnel pulling/pushing on the second end of the conveyor belt). For example, the torque applied by the torsional springs in the third portion of the length may be insufficient to push the third portion of the length across the floor. That is, the third portion of the length may remain in the retracted position until the personnel pushes or pulls the third portion of the length into the deployed state. However, when initially deployed, momentum generated by the torsional springs within the first portion of the length and the second portion may cause the conveyor mat to fully deploy.

Although the conveyor mat assembly is discussed herein finding use when loading packages within a vehicle, the conveyor mat assembly may be usable in other applications or environments (e.g., food processing, manufacturing, trailers, etc.). Additionally, other mechanism or systems may be used to deploy and retract the conveyor mat (e.g., ratchet, reel, etc.). The conveyor mat is also sized and configured depending on the type of vehicle and/or environment in which the conveyor mat is used. In some instances, the conveyor mat is sized and configured to reside within the vehicle to provide the personnel quick and convenient access to the conveyor mat.

Accordingly, the conveyor mat assembly may be used to quickly, conveniently, and safely load packages on and/or off the vehicle. This may, in some instances, reduce a number of instances in which personnel climbs into and out of the vehicle, an amount of time spent loading the packages onto the vehicle, injuries to the personnel, and/or damage to packages. For example, conventionally packages may be individually loaded, whether pushed onto, pulled onto, or thrown into the vehicle. Therein, the personnel may climb into the vehicle to sort the packages onto shelves within the vehicle. Comparatively, the conveyor mat assembly allows the personnel to conveniently push multiple packages (or bins containing the packages) into the vehicle, and therein, sort the packages onto the shelves.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates a perspective view of an example conveyor mat assembly 100, showing an example conveyor mat 102 of the conveyor mat assembly 100 in a retracted state, according to examples of the present disclosure. As discussed herein, from the retracted state, the conveyor mat 102 is configured to transition to a deployed state.

In some instances, the conveyor mat assembly 100 includes a frame 104, a tensioning system 106, a plurality of first rollers 108, a plurality of second rollers 110, a plurality of linkages 112, and a plurality of supports 114. As will be explained herein, the first rollers 108 and the second rollers 110 may be coupled together via the linkages 112, the supports 114, as well as axles disposed through the first rollers 108, the second rollers, the linkages 112, and the supports 114 to form the conveyor mat 102. As shown in FIG. 1, the linkages 112 and the supports 114 may be in a folded configuration (e.g., accordion style) within a footprint of the frame 104. During deployment of the conveyor mat 102, the linkages 112 and supports 114 are unfolded from the frame 104 to form a rolling surface (e.g., platform) on which packages are capable of being slid.

The frame 104 may include a first end 116 and a second end 118 (e.g., spaced apart in the Z-direction). When deployed, the conveyor mat 102 may extend out the second end 118 of the frame 104. In other words, the second end 118 of the frame 104 may be open in order to deploy the conveyor mat 102 from and/or out of the frame 104, as well as receive the conveyor mat 102 when transitioned to the retracted state. The tensioning system 106 couples to, or is disposed proximate to, the first end 116 of the frame 104. As will be explained herein, the tensioning system 106 may be configured to both deploy and retract the conveyor mat 102.

The frame 104 further includes a first side 120, a second side 122 (e.g., spaced apart in the X-direction), and a bottom 124. Sides of the conveyor mat 102 may be disposed between the first side 120 and the second side 122. The bottom 124 is configured to reside on a floor of the vehicle. For example, the bottom 124 may rest on the floor of the vehicle, and thereafter, the conveyor mat 102 may be deployed into the vehicle (or across the floor of the vehicle). In some instances, the first side 120 of the frame 104 includes a handle 126 to permit carrying or otherwise transporting of the conveyor mat 102. In some instances, foam or other padding may be wrapped completely or at least partially around the handle 126. Guides 128, such as a first guide 128(1) and a second guide 128(2), are shown coupled to the frame 104 on the first side 120 and the second side 122, respectively. In some instances, the guides 128 represent wheels that rotate about an axis that is transverse to a deployment direction of the conveyor mat 102. For example, the wheels may rotate about the Y-axis while the conveyor mat 102 deploys in a direction along the Z-axis. In some instances, the guides 128 may assist in deploying the conveyor mat 102 from the frame 104 and retracting the conveyor mat 102 into the frame 104. For example, the guides 128 may engage the first rollers 108, the second rollers 110, the linkages 112, the supports 114, and so forth to guide the conveyor mat 102 into the frame 104 and prevent the first rollers 108, second rollers 110, the linkages 112, the supports 114, and so forth snagging or catching on the second end 118 of the frame 104.

In the retracted state, the conveyor mat 102 may have a width that extends between the first side 120 and the second side 122, a length that is disposed within the first end 116 and the second end 118, and a height that extends between the bottom 124 and a top of the conveyor mat 102. In some instances, the width may be approximately between ten inches and twenty inches, the length may be approximately between five inches to twenty inches, and the height may be approximately between ten inches and fourteen inches. However, other dimensions are envisioned.

In some instances, a pedal 130 may couple to the conveyor mat 102. In some instances, the pedal 130 may reside within a footprint of the frame 104 in the retracted state. In some instances, the pedal 130 may assist in retracting the conveyor mat 102 from the deployed state to the retracted state.

Figure 2:
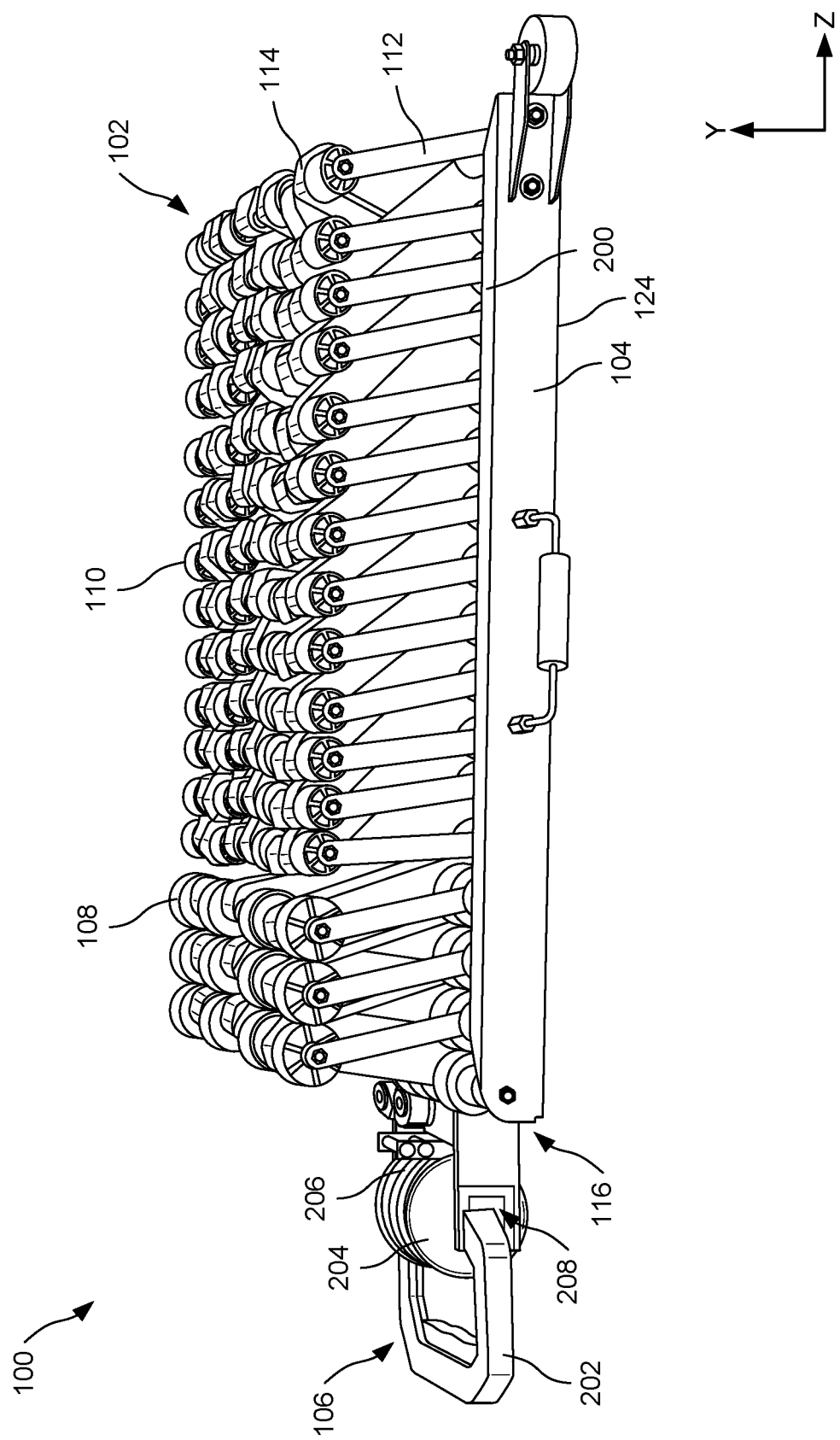
FIG. 2 illustrates a side view of the conveyor mat assembly of FIG. 1, showing the conveyor mat in a retracted state, according to an example of the present disclosure.

FIG. 2 illustrates a side view of the conveyor mat assembly 100, showing the conveyor mat 102 in the retracted state, according to examples of the present disclosure.

In the retracted state, the linkages 112 and the supports 114 are shown arranged in a vertical position. During deployment, the linkages 112 and supports 114 are configured to be arranged in a horizontal position, along a length of the conveyor mat 102. The first rollers 108 are shown including a first diameter that is greater than a second diameter of the second rollers 110. As shown, the conveyor mat 102 may include a lesser number of the first rollers 108 as compared to the second rollers 110. The first rollers 108 are configured to reside within the length of the frame 104 (Z-direction) when the conveyor mat 102 is deployed. The frame 104 may have a thickness that extends from the bottom 124, to a top surface 200 of the frame 104. When deployed, the first rollers 108 may extend above the top surface 200 such that the rolling surface of conveyor mat 102 resides vertically above the top surface 200. Additionally, the larger diameter of the first rollers 108 may assist in retracting and deploying the conveyor mat 102.

The tensioning system 106 is further shown coupled to the first end 116 of the frame 104. The tensioning system 106 may include a handle 202, and a spool 204 rotationally coupled to the handle 202. A cord 206 may be wound about the spool 204. During deployment of the conveyor mat 102, the cord 206 may unwind from the spool 204 (e.g., clockwise), and during retracting, the cord 206 may wind about the spool 204 (e.g., counterclockwise). A receptacle 208 may receive the handle 202. The receptacle 208 may represent a mount, bracket, and so forth that receives the handle 202. In some instances, the receptacle 208 couples to the first end 116 of the frame 104, or may be formed as part of the frame 104.

Figure 3:
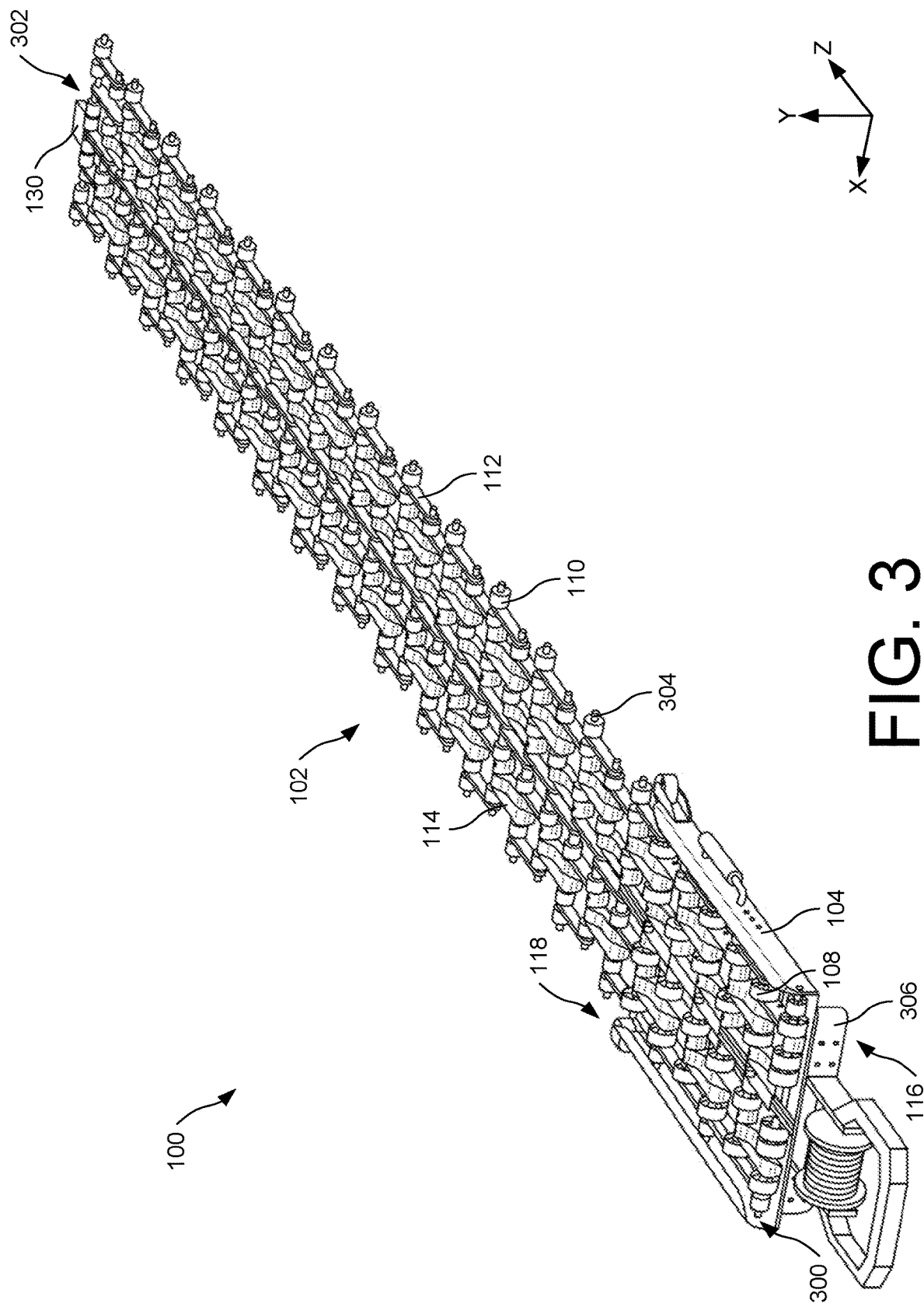
FIG. 3 illustrates a perspective view of the conveyor mat assembly of FIG. 1, showing the conveyor mat in a deployed state, according to an example of the present disclosure.

FIG. 3 illustrates a perspective view of the conveyor mat assembly 100, showing the conveyor mat 102 in a deployed state, according to examples of the present disclosure. From example, from the retracted state as shown in FIGS. 1 and 2, the conveyor mat 102 may be deployed (e.g., in the Z-direction). In the deployed state, the linkages 112 and the supports 114 may extend in a direction (e.g., along the Z-axis) to form a rolling surface of the conveyor mat 102 on which packages are configured to be pushed. That is, from the vertical position of the linkages 112 and the supports 114, the linkages 112 and the supports 114 may be horizontally arranged (e.g., lay flat) along the floor of the vehicle.

In some instances, and as shown, a portion of the first rollers 108, the second rollers 110, the linkages 112, and the supports 114 reside within the frame 104, while a portion of the first rollers 108, the second rollers 110, the linkages 112, and the supports 114 reside external to the frame 104 (e.g., extend past the second end 118 of the frame 104). For example, the conveyor mat 102 may include a proximal end 300 and a distal end 302. The proximal end 300 may couple to the frame 104, proximate to the first end 116 of the frame 104. The coupling of the proximal end 300 to the frame 104 keeps the conveyor mat 102 attached to the frame 104 in the deployed state and provides a mounting point for retracting the conveyor mat 102. The distal end 302 is permitted to extend past and out of the frame 104. The pedal 130 is further shown coupled to the conveyor mat 102, for example, at the distal end 302. When deployed, the pedal 130 is configured to be disposed interior to the vehicle.

The linkages 112 and the supports 114 may be coupled end-to-end to form a length of the conveyor mat 102 in the deployed state (e.g., in the Z-direction). In some instances, the linkages 112 and the supports 114 are coupled end-to-end via axles 304 disposed through channels, holes, slots, etc. in the linkages 112 and the supports 114. For example, the linkages 112 and the supports 114 may include channels through which the axles 304 are disposed. The axles 304 may be routed through ends of the linkages 112 and the supports 114 to form the length of the conveyor mat 102. In some instances, the length of the conveyor mat 102 in the deployed state may be approximately between ten and twenty feet. Further, the linkages 112 and the supports 114 are arranged in an adjacent fashion, side-by-side, to form a width of the conveyor mat 102 (e.g., in the X-direction). Moreover, the first rollers 108 and the second rollers 110 may be disposed about the axles 304 in order to deploy and form the rolling surface in the deployed state.

The frame 104 is further shown including a flange 306 disposed at the first end 116. The flange 306 may be configured to engage with a lip or end of the floor of the vehicle. For example, the flange 306 may abut an end of the floor of the vehicle to resist the conveyor mat 102 (or the conveyor mat assembly 100) translating into the vehicle during use. In this manner, the flange 306 may engage with the vehicle to prevent a reorientation and/or movement of the conveyor mat 102. In some instances, the flange 306 may include a padding or other cushion that prevents the flange 306 scratching the vehicle.

Figure 4:
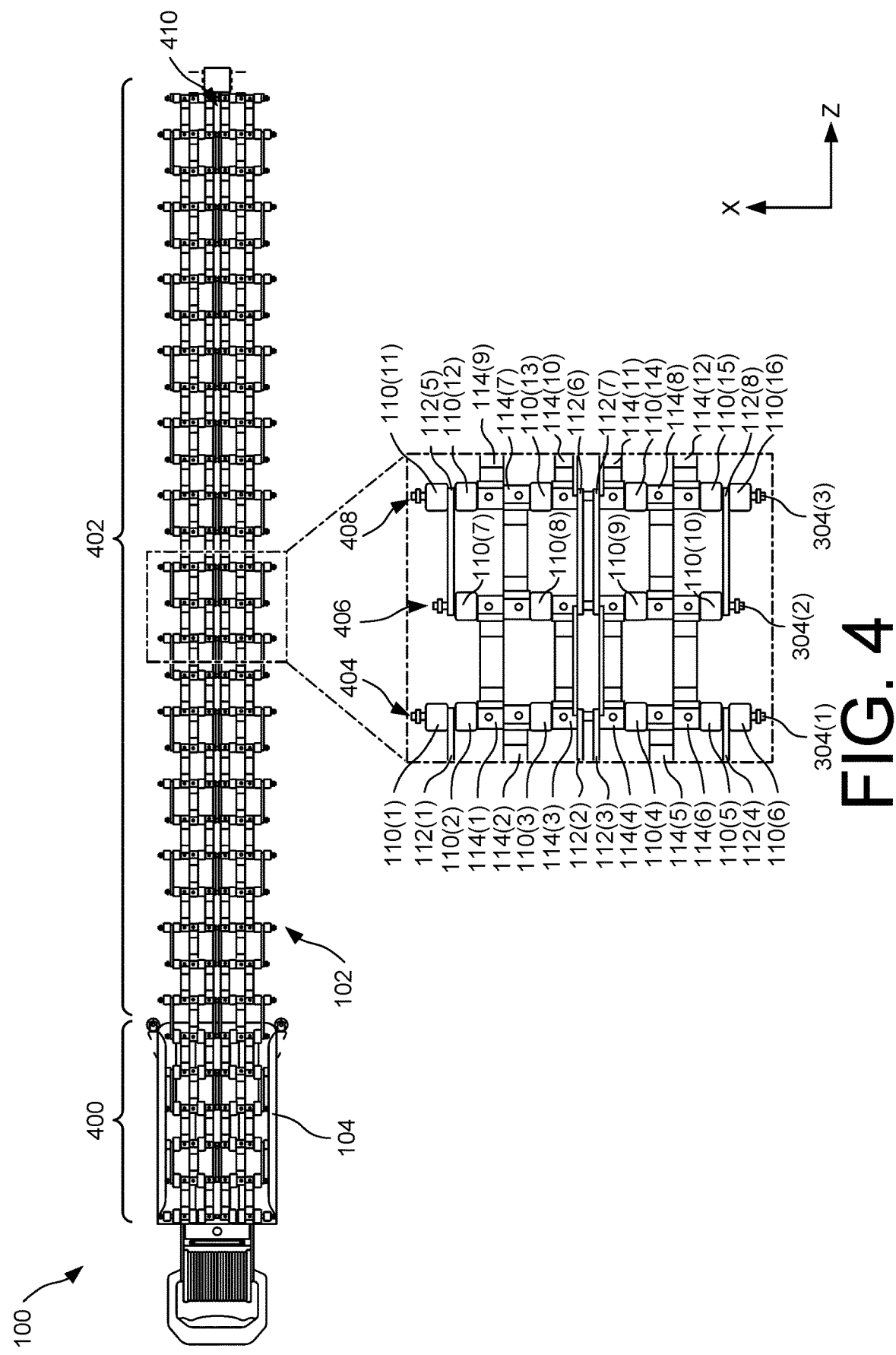
FIG. 4 illustrates a top view of the conveyor mat assembly of FIG. 1, showing the conveyor mat in a deployed state, according to an example of the present disclosure.

FIG. 4 illustrates a top view of the conveyor mat assembly 100, showing the conveyor mat 102 in a deployed state, according to examples of the present disclosure.

As introduced above, in the deployed state, a portion of the conveyor mat 102 may reside within the frame 104, while another portion of the conveyor mat 102 extends beyond the frame 104. For example, a first portion 400 of the length may reside within the frame 104, while a second portion 402 of the length may reside external to the frame 104. However, the linkages 112 and the supports 114 are coupled together, via the axles 304, so as to adjoin the first portion 400 and the second portion 402.

A detailed view of a section of the conveyor mat 102 is shown in FIG. 4. The section may be part of the second portion 402 of the length. The detailed view illustrates that the linkages 112 and the supports 114 are coupled end-to-end via the axles 304 disposed through the linkages 112 and the supports 114. Additionally, the linkages 112 and the supports 114 are coupled via the axles 304 across the width of the conveyor mat 102. In some instances, the section of the conveyor mat 102 may repeat along the length of the conveyor mat 102. In some instances, the section may include a first row 404, a second row 406, and a third row 408. The first row 404, for example, may include four linkages 112, six supports 114, and six second rollers 110. The second row 406, for example, may include four linkages 112, six supports 114, and four second rollers 110. The third row 408, for example, may include four linkages 112, six supports 114, and six second rollers 110.

A first axle 304(1) may be disposed through the linkages 112, the supports 114, and the second rollers 110 in the first row 404, a second axle 304(2) may be disposed through the linkages 112, the supports 114, and the second rollers 110 in the second row 406, and a third axle 304(3) may be disposed through the linkages 112, the supports 114, and the second rollers in the third row 408. Additionally, the first axle 304(1) may be disposed through the linkages 112, the supports 114, and the second rollers 110 in a row of a prior section (e.g., closer to the proximal end 300 than the section), while the third axle 304(3) may be disposed through the linkages 112, the supports 114, and the second rollers in a row of a subsequent section (e.g., closer to the distal end 302 than the section).

Across the width of the conveyor mat 102, moving from left to right (e.g., in the X-direction), the first row 404 includes a first of the second rollers 110(1), a first of the linkages 112(1), a second of the second rollers 110(2), a first of the supports 114(1), a second of the supports 114(2), a third of the second rollers 110(3), a third of the supports 114(3), a second of the linkages 112(2), a third of the linkages 112(3), a fourth of the supports 114(4), a fourth of the second rollers 110(4), a fifth of the supports 114(5), a sixth of the supports 114(6), a fifth of the second rollers 110(5), a third of the linkages 112(3), and a sixth of the second rollers 110(6).

Across the width of the conveyor mat 102, moving from left to right (e.g., in the X-direction), the second row 406 includes a fifth of the linkages 112(5), a seventh of the second rollers 110(7), the first of the supports 114(1), a seventh of the supports 114(7), an eighth of the second rollers 110(8), the third of the supports 114(3), a sixth of the linkages 112(6), a seventh of the linkages 112(7), the fourth of the supports 114(4), a ninth of the second rollers 110(9), an eighth of the supports 114(8), the sixth of the supports 114(6), a tenth of the second rollers 110(10), and an eighth of the linkages 112(8).

Across the width of the conveyor mat 102, moving from left to right (e.g., in the X-direction), the third row 408 includes an eleventh of the second rollers 110(11), the fifth of the linkages 112(5), a twelfth of the second rollers 110(12), a ninth of the supports 114(9), the seventh of the supports 114(7), a thirteenth of the second rollers 110(13), a tenth of the supports 114(10), the sixth of the linkages 112(6), the seventh of the linkages 112(7), an eleventh of the supports 114(11), a fourteenth of the second rollers 110(14), the eighth of the supports 114(8), a twelfth of the supports 114(12), a fifteenth of the second rollers 110(15), the eighth of the linkages 112(8), and a sixteenth of the second rollers 110(16).

The second rollers 110, the linkages 112, and the supports 114 may be secured to the axles 304 via fasteners (e.g., nuts) fastened to ends of the axles 304. The fasteners may prevent disengagement between the second rollers 110, the linkages 112, and the supports 114. Additionally, although the discussion is with regard to the second rollers 110, the linkages 112, and the supports 114, the first rollers 108 may couple to the axles 304 in a similar manner, and the linkages 112 and the supports 114 may be interposed between the first rollers 108 in a similar manner. Additionally, although a particular arrangement (e.g., stack) of the second rollers 110, the linkages 112, and/or the supports 114 are shown, the second rollers 110, the linkages 112, and/or the supports 114 may be arranged in a different manner than shown. Additionally, although a single axle is described as extending across the width of the conveyor mat 102, more than one axle may be included. For example, the first axle 304(1), the second axle 304(2), and/or the third axle 304(3) may be split into more than one continuous axle that extends across the width of the conveyor mat 102.

A spine 410 may be formed in the conveyor mat 102. The spine 410 may extend through a middle of the conveyor mat 102 (e.g., across the width of the conveyor mat 102). In some instances, the spine 410 is formed via the linkages 112 and the supports 114. For example, the spine 410 may represent a channel formed through the middle of the conveyor mat 102. The cord 206 may route along the spine 410.

Figure 5:
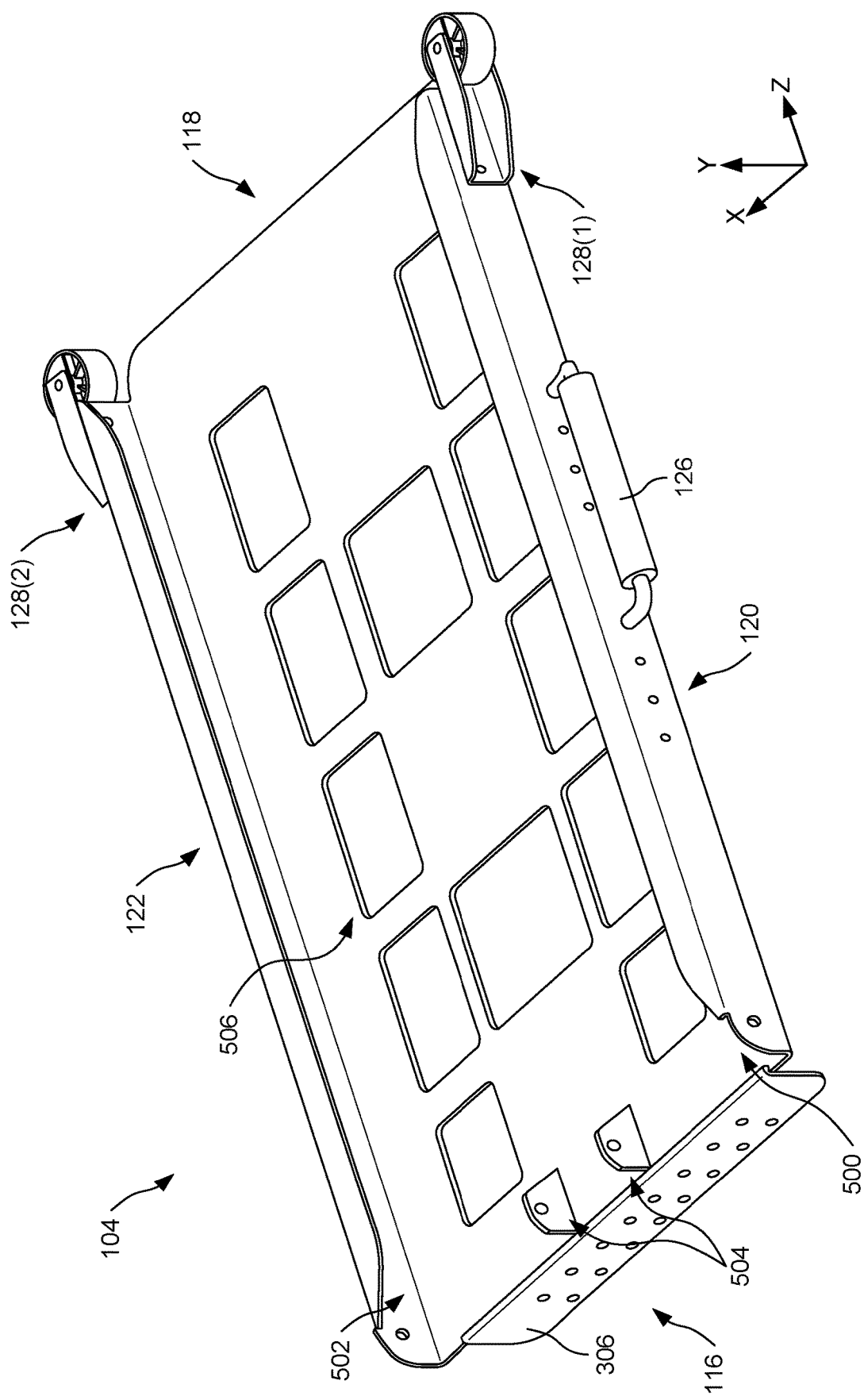
FIG. 5 illustrates an example frame of the conveyor mat assembly of FIG. 1, according to an example of the present disclosure.

FIG. 5 illustrates the frame 104 of the conveyor mat assembly 100, according to examples of the present disclosure. The frame 104 includes the first end 116, the second end 118, the first side 120, and the second side 122. The handle 126 is shown coupled to the first side 120 for transporting the conveyor mat assembly 100. In some instances, foam or other padding may be wrapped completely or at least partially around the handle 126. Additionally, the first guide 128(1) and the second guide 128(2) are shown coupled to the frame 104 on the first side 120 and the second side 122, respectively. The first guide 128(1) and the second guide 128(2) may represent wheels that rotate about an axis that is transverse to a deployment direction of the conveyor mat 102. The frame 104 further includes the flange 306 disposed at the first end 116. The flange 306 may abut an end of the floor of the vehicle to resist the conveyor mat assembly 100 translating into the vehicle during use.

The frame 104 may include a first track 500 and a second track 502, disposed on the first side 120 and second side 122 of the frame 104, respectively. The first track 500 and the second track 502 may receive at least a portion of the second rollers 110. For example, in the retracted state, a portion of the second rollers 110 may reside within the first track 500 and the second track 502. In some instances, the first track 500 and the second track 502 prevent the second rollers 110 (and therefore the conveyor mat 102) disengaging with the frame 104 in the retracted state. For example, the second rollers 110 may be confined (e.g., in the Y-direction) within the first track 500 and the second track 502. This may enable, in the retracted state, the conveyor mat assembly 100 to be carried without the conveyor mat 102 falling out of the frame 104.

An axle 304 closest to the first end 116 of the frame 104 may be coupled to the frame 104 to couple to secure the conveyor mat 102 to the frame 104. For example, the frame 104 includes a pair of tabs 504 for receiving an axle disposed at the proximal end 300 of the conveyor mat 102. For example, an axle at the proximal end 300 of the conveyor mat 102 may be disposed through the tabs 504 for coupling the axle, the therefore the proximal end 300 of the conveyor mat 102, to the frame 104. Openings may be included in the tabs 504, as well as the frame 104 (e.g., at the first track 500 and the second track 502) for receiving the axle 304.

In some instances, the frame 104 may include various cutouts 506. The cutouts 506 may serve to receive a weight of the frame 104, and therefore the conveyor mat assembly 100. As shown, and in some instances, the cutouts 506 may be located on a bottom (e.g., bottom surface) of the frame 104. Any number of cutouts 506 may be included, and the cutouts 506 may include any shape (e.g., square, rectangular, circular, etc.). Additionally, in some instances, the bottom surface of the frame 104 in contact with or abutting the vehicle floor may include pads (e.g., rubber, silicone, foam, etc.) for increasing friction between the conveyor mat assembly 100 and the vehicle floor. This increase in friction may prevent slippage or a reorientation of the conveyor mat assembly 100 within the vehicle (e.g., when the conveyor mat 102 is being retracted).

Figure 6:
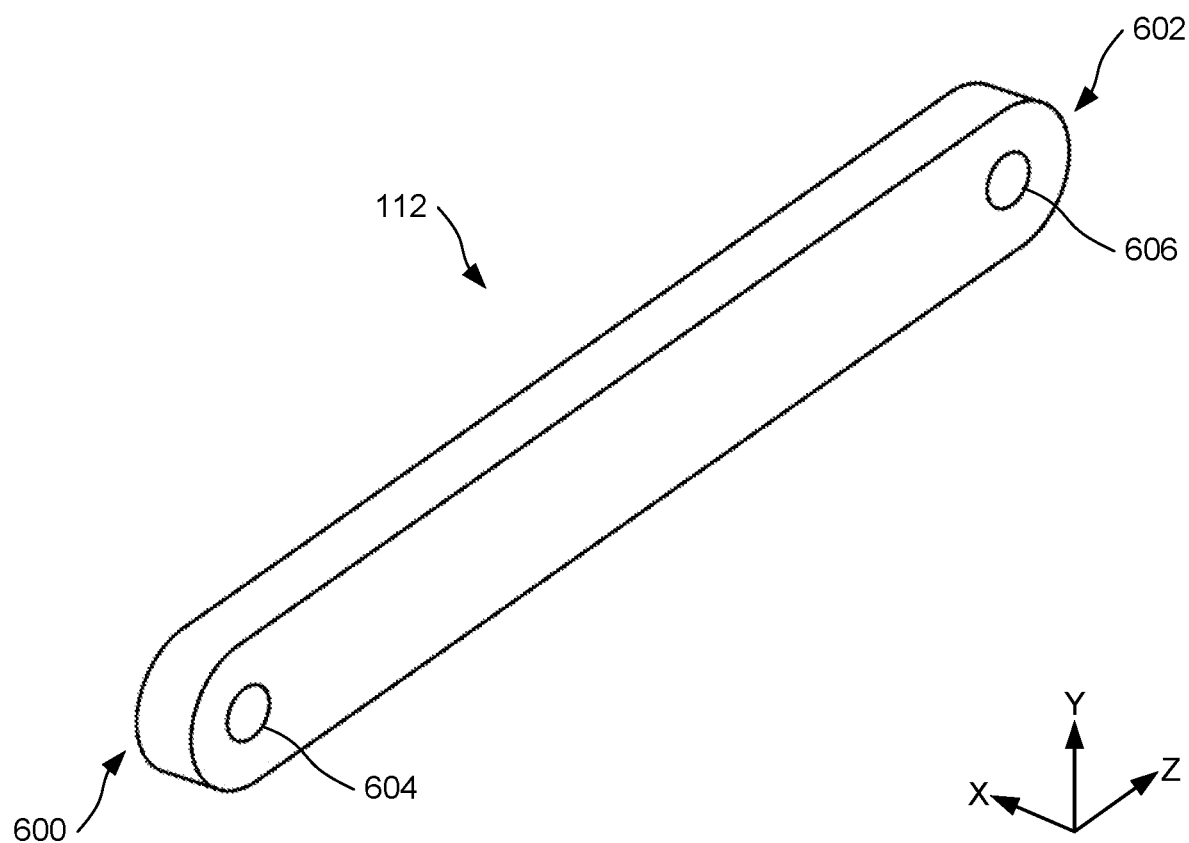
FIG. 6 illustrates an example linkage of the conveyor mat of FIG. 1, according to an example of the present disclosure.

FIG. 6 illustrates the linkage 112 of the conveyor mat 102, according to examples of the present disclosure. The linkage 112 includes a first end 600 and a second end 602, spaced apart from the first end 600. A first hole 604 is disposed through a thickness of the linkage 112, proximate to or at the first end 600, for receiving the axles 304. A second hole 606 is disposed through the thickness of the linkage 112, proximate to or at the second end 602, for receiving the axles 304.

Figure 7A:
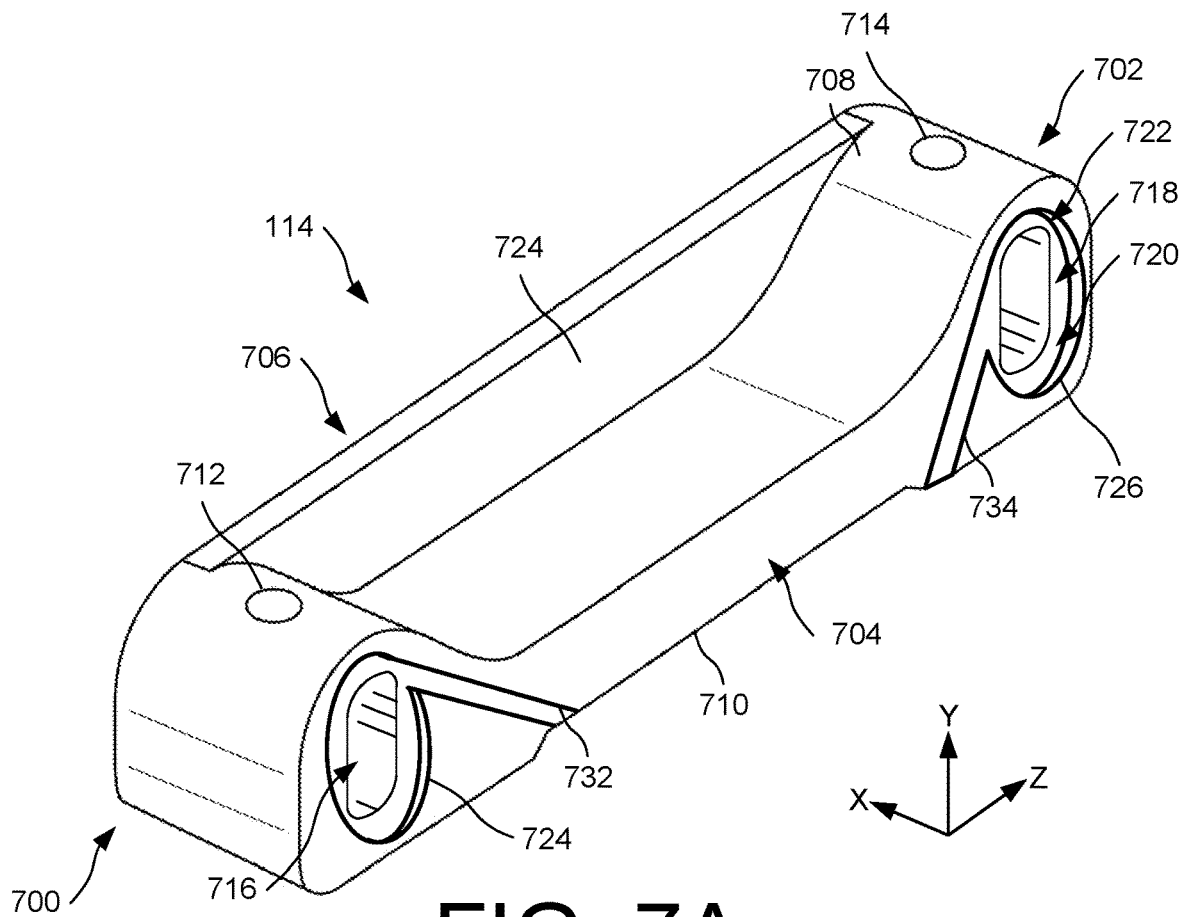
FIGS. 7A and 7B illustrate an example support of the conveyor mat of FIG. 1, according to an example of the present disclosure.
Figure 7B:
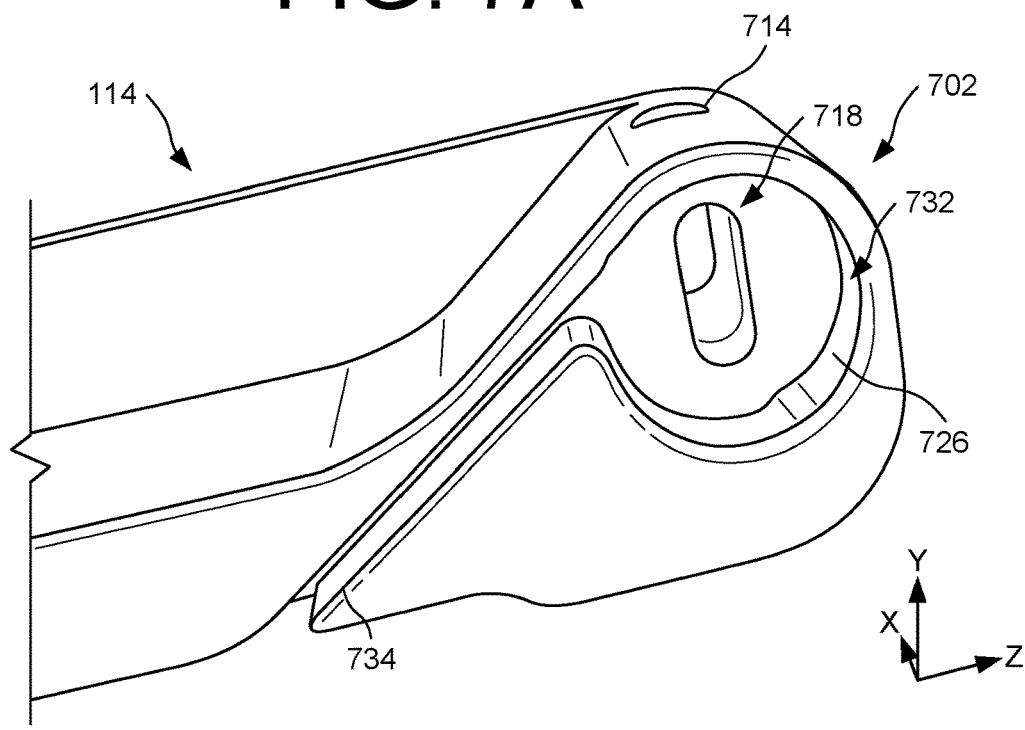

FIGS. 7A and 7B illustrate the support 114 of the conveyor mat 102, according to examples of the present disclosure. The support 114 may include a first end 700 and a second end 702, spaced apart from the first end 700. The support 114 may also include a first side 704, a second side 706 spaced apart from the first side 704, a top surface 708, and a bottom surface 710 spaced apart from the top surface 708.

The support 114 may include a first thickness that extends between the bottom surface 710 and the top surface 708, at the first end 700 and the second end 702. The support 114 may include a second thickness that extends between the bottom surface 710 and the top surface 708, at a location between the first end 700 and the second end 702 (e.g., spaced inward from the first end 700 and the second end 702). A first channel 712 and a second channel 714 are disposed at least partially through the support 114. For example, the first channel 712 may be located at the first end 700, and extend from the top surface 708 in a direction towards the bottom surface 710. The second channel 714 may be located at the second end 702, and extend from the top surface 708 in a direction towards the bottom surface 710. The first channel 712 and the second channel 714 may, in some instances, extend at least partially through the thickness of the support 114 (e.g., less than an entirety of the thickness, or through the entirety of the thickness).

The support also includes a first slot 716 and a second slot 718, disposed proximate to the first end 700 and the second end 702, respectively. The first slot 716 and the second slot 718 may extend through the support 114, across a width of the support 114 (e.g., in the X-direction), between the first side 704 and the second side 706. The first slot 716 and the second slot 718 may include a bottom end 720 and a top end 722, spaced above the bottom end 720. A length of the first slot 716 and the second slot 718 may extend between the bottom end 720 and the top end 722. The first slot 716 and the second slot 718 are configured to receive the axle 304, and the axle 304 is configured to translate within the first slot 716 and second slot 718, respectively. For example, the axle 304 may translate between the bottom end 720 and the top end 722.

In some instances, the first slot 716 and the second slot 718 are located within recesses formed on the first side 704 (or extending inward from an exterior surface at the first side 704). For example, the first slot 716 may be located within a first recess 726 and the second slot 718 may be located with a second recess 726. As shown, the first recess 726 and the second recess 728 may be circular shaped or ovular shaped. As explained herein, a depth 730 of the first recess 726 and the second recess 728 may receive a portion of a torsional spring utilized to deploy the conveyor mat 1020. For example, a portion (e.g., half) of the first recess 726 or the second recess 728 may receive part of the torsional spring. Additionally, arms, such as a first arm 732 and a second arm 734 may extend from the first recess 726 and the second recess 728, respectively. The first arm 726 and the second arm 728 may receive a prong of the torsional spring for securely coupling the torsional spring to the support 114, as well as applying a force to the support 114 necessary for deployment.

An opposite prong of the torsional spring, as well as a remaining portion of the body of the torsional spring, may reside within an adjacent recess disposed next to the first recess 726 or the second recess 728. For example, as introduced in FIG. 4, supports 114 may be disposed adjacent to one another across the width of the conveyor mat 102. Here, a first support may include a first recess that receives a portion of a torsional spring, as well as a first arm that receives a first arm of the torsional spring. A second support may reside adjacent to the first support, such that a second recess of the second support receives a portion of the torsional spring, and a second arm of the second support receives a second arm of the torsional spring. In doing so, the torsional spring acts on the supports 114 during deployment, and the supports act on the torsional springs during retraction to coil the torsional springs. In some instances, not all of the supports 114 along the conveyor mat 102 may include (or receive) a torsional spring. Instead, in some instances, only a portion of the supports 114 placed adjacent to one another may include torsional springs.

As explained herein, a coil spring may reside within the first channel 712 and the second channel 714 and engage with the axle 304 at a location within the first channel 712/the second channel 714, as well as the first slot 716/the second slot 718, respectively. For example, the coil spring may be disposed between an end of the first channel 712 and the axle 304, and between an end of the second channel 714 and the axle 304. The coil spring may bias the axle 304 towards the top end 722. However, upon application of a certain amount of force, the coil spring may compress and the axle 304 may be biased towards the bottom end 720. During this instance, the first rollers 108, the second rollers 110, and/or the linkages 112 may correspondingly translate (given the coupling to the axles).

To further elaborate, the conveyor mat 102 may include a safe step feature that serves to avoid injury to personnel working within the vehicle. For example, after deploying the conveyor mat 102, the personnel may accidently or purposefully step on a portion of the conveyor mat 102 within the vehicle. Under the weight of the personnel (e.g., via stepping on the first rollers 108 and/or the second rollers 110), the axles 304 may translate within the first slot 716 and/or the second slot 718, respectively. Therein, the axles 304 may be urged towards the bottom end 720. At this position, the first rollers 108 and/or the second rollers 110 may contact the floor of the vehicle and be prevented from rotating (e.g., via a resistance between the first rollers 108 and the floor, and/or the second rollers 110 and the floor). As such, this may prevent the personnel slipping on the conveyor mat 102. After the foot of the personnel is removed, the coil spring may bias the axles 304 towards the top end 722 such that the first rollers 108 and/or the second rollers 110 provide the rolling surface for the packages. Additional details of the coil springs, and their engagement with the supports 114, are discussed herein in FIG. 16.

When deployed, the bottom surface 710 of the supports 114 may rest on or contact the floor of the vehicle. In some instances, the bottom surface 710 may be substantially planar (e.g., flat). The second side 706 of the support 114 may include a sidewall 724, while the first side 704 of the support 114 may be open. The sidewall 724, in some instances, may assist in forming the spine 410 of the conveyor mat 102. For example, given that the cord 206 may be routed along the spine 410, the sidewall 724 may assist in keeping the cord 206 within the spine 410.

Figure 8:
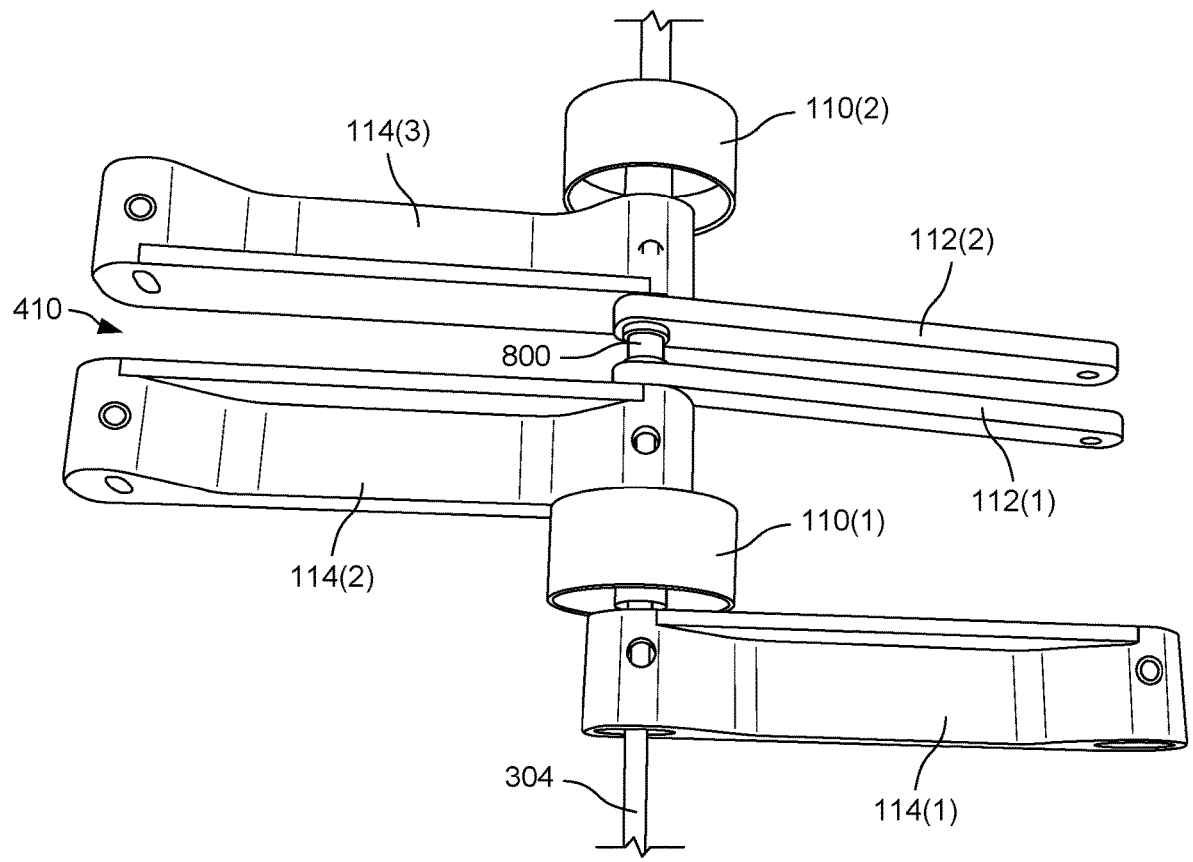
FIG. 8 illustrates an example coupling between components of the conveyor mat of FIG. 1, according to an example of the present disclosure.

FIG. 8 illustrates an example coupling of the linkages 112 and the supports 114, according to examples of the present disclosure.

In FIG. 8, the axle 304 is shown disposed through a first of the supports 114(1), a first of the second rollers 110(1), a second of the supports 114(2), a first of the linkages 112(1), a hub 800, a second of the linkages 112(2), a third of the supports 114(3), and a second of the second rollers 110(2). Each of the first of the supports 114(1), the first of the second rollers 110(1), the second of the supports 114(2), the first of the linkages 112(1), the hub 800, the second of the linkages 112(2), the third of the supports 114(3), and the second of the second rollers 110(2) may include a passageway through which the axle 304 is disposed. Additionally, each of the first of the supports 114(1), the first of the second rollers 110(1), the second of the supports 114(2), the first of the linkages 112(1), the hub 800, the second of the linkages 112(2), the third of the supports 114(3), and the second of the second rollers 110(2) may be rotationally disposed about the axle 304 such that the axle 304 is permitted to rotate (e.g., about the X-axis).

In some instances, the hub 800 may route the cord 206 along the spine 410. The hub 800 may include a central channel (e.g., groove) along which the cord 206 rests. During deployment and retraction of the conveyor mat 102, the cord 206 may slide along or otherwise over the central channel. In some instances, the hub 800 may reduce an amount of friction imparted to the cord to permit the conveyor mat 102 to be deployed and retracted in a convenient matter.

The linkages 112, the supports 114, the first rollers 108, the second rollers 110, the hubs 800, and/or other components may be secured to the axle 304 via fasteners disposed at ends of the axle 304. For example, the fasteners (e.g., nuts) may be disposed on ends of the axle 304 and prevent the linkages 112, the supports 114, the first rollers 108, the second rollers 110, the hubs 800, and/or other components sliding off the axle 304.

Figure 9:
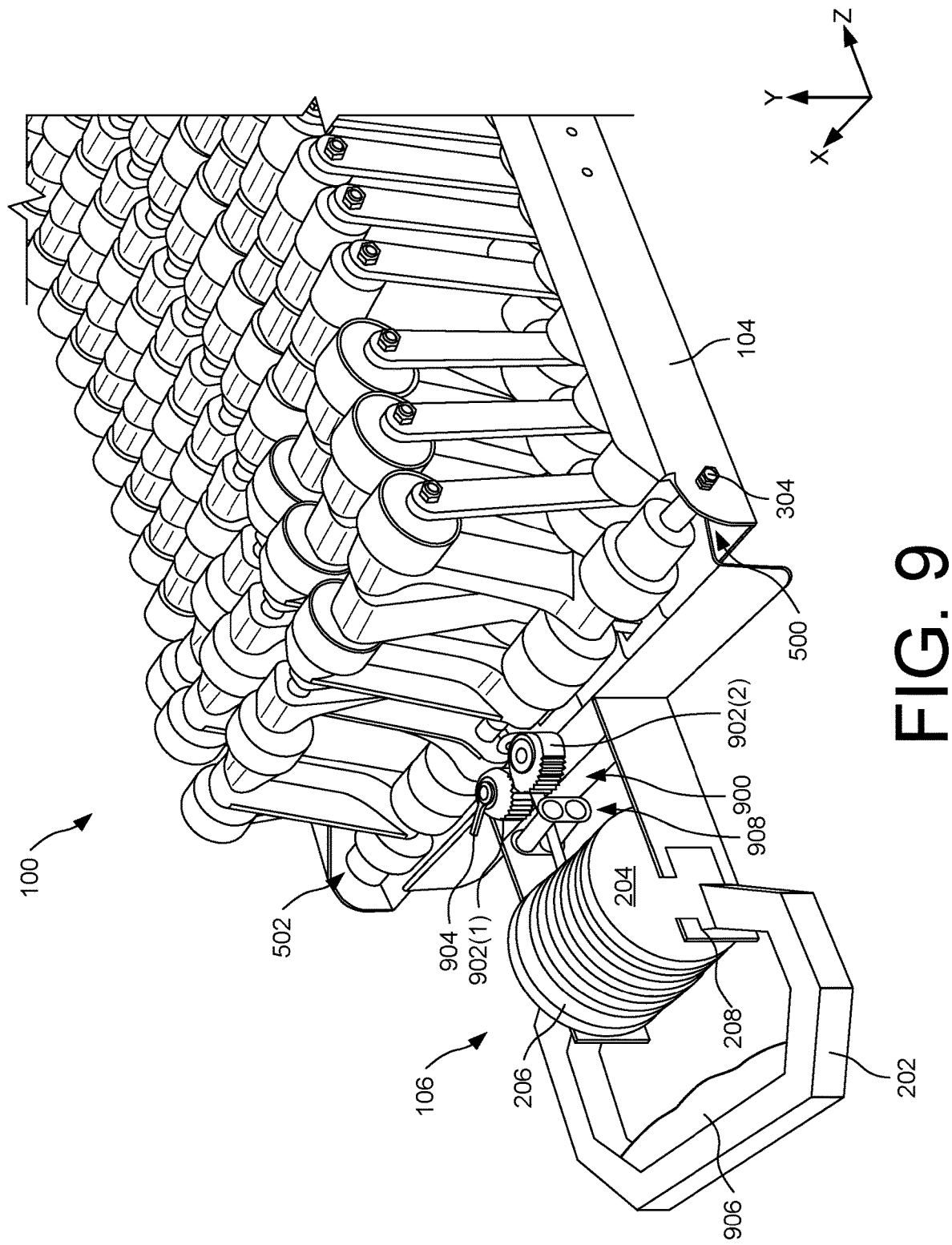
FIG. 9 illustrates an example tensioning system of the conveyor mat assembly of FIG. 1 that is usable to deploy and retract the conveyor mat, according to an example of the present disclosure.

FIG. 9 illustrates the tensioning system 106 of the conveyor mat assembly 100, according to examples of the present disclosure. As illustrated, the handle 202 may engage within the receptacle 208 extending from the first end 116 of the frame 104. The spool 204 rotationally couples to the handle 202, and the cord 206 is wound about the spool 204.

The tensioning system 106 may include a locking mechanism 900 that functions to disengage the cord 206 and permit the conveyor mat 102 to transition to the deployed state. In the retracted state, the locking mechanism 900 engages with the cord 206 to prevent the conveyor mat 102 transitioning to the deployed state. In some instances, the locking mechanism represents a pair of offset cam locks 902, such as a first offset cam lock 902(1) and a second offset cam lock 902(2), through which the cord 206 is routed. A lever 904 may couple to one of the offset cam locks 902, such as the first offset cam lock 902(1), to control an engagement with the cord 206. For example, when the lever 904 is rotated (e.g., in the clockwise direction), a spacing between the offset cam locks 902 may increase, causing the offset cam locks 902 to disengage (or at least partially disengage) with the cord 206. More particularly, given a shape of the offset cam locks 902 (e.g., ovular), the lever 904 may move the first offset cam lock 902(1) away from the cord 206, thereby disengaging the cord 206, and permitting the cord 206 to unwind from the spool 204. Although the lever 904 is shown coupled to the first offset cam lock 902(1), additionally or alternatively, a lever may couple to the second offset cam lock 902(2).

In some instances, a coil spring engages with the spool 204 such that the spool 204 takes up slack in the cord 206. The coil spring may pull on the cord 206 (e.g., about the X-axis in a counterclockwise fashion) such that the cord 206 remains taut and winds onto the spool 204. The handle 202 may also include a switch 906 (e.g., lever, button, etc.) that locks rotation of the spool 204 during retraction of the conveyor mat 102. For example, by holding down the switch 906 (e.g., pressing/gripping with fingers of the personnel), the spool 204 may be prevented from rotating. Herein, the personnel may pull on the handle 202. Given the locked nature of the spool 204, the cord 206 may be pulled through the tensioning system 106 (e.g., between the offset cam locks 902). Releasing the switch 906 allows the cord 206 to wind around the spool 204, for example, given that the coil spring imparts rotation to the spool 204. During this instance, however, the cord 206 remains secured within the locking mechanism 900 to prevent the conveyor mat 102 transitioning to the deployed state. That is, the cord 206 may not be pulled in an opposite direction through the offset cam locks 902.

The tensioning system 106 may also include a pair of rollers 908 through which the cord 206 is disposed, between the spool 204 and the locking mechanism 900. The rollers 908 may maintain and alignment of the cord 206 with the locking mechanism such that the locking mechanism 900 is able to engage the cord 206.

The frame 104 is further shown including the first track 500 and the second track 502, disposed on the first side 120 and second side of the frame 104, respectively. The first track 500 and the second track 502 may receive at least a portion of the second rollers 908. For example, the second rollers 908 may be confined (e.g., in the Y-direction) within the first track 500 and the second track 502. This may enable, in the retracted state, the conveyor mat assembly 100 to be carried without the conveyor mat 102 falling out of the frame 104. As further shown, an axle 304 closest to the first end 116 of the frame 104 may be coupled to the frame 104 to couple to secure the conveyor mat 102 to the frame 104. The axle 304 may be disposed through the tabs 504 of the frame 104 to couple the conveyor mat 102 to the frame 104.

In some instances, a housing is disposed over the locking mechanism 900 and/or the rollers 908. The housing may prevent injury to the personnel operating the conveyor mat assembly 100 (e.g., pinching via the offset cam locks 902). In the event that the conveyor mat assembly 100 includes the housing, the lever 904 couple to the first offset cam lock 902(1) may be accessible via an exterior of the housing.

Although the offset cam locks 902 are shown at a location outside a footprint of the frame 104, in some instances, the offset cam locks 902 may be disposed inward from the first end 116 of the frame 104 (e.g., in the Z-direction). In such instances, the axle 304 that couples the conveyor mat 102 to the frame 104 may be spaced inward to accommodate the offset cam locks 902. Additionally, the rollers 908 may be located within the footprint of the frame 104.

In some instances, tabs are located at an opening of the receptacle 208 to prevent the handle 202 disengaging with the receptacle 208. In some instances, the tabs may be biased (e.g., deflected) when the handle 202 is removed from the receptacle 208 and when the handle 202 is placed back within the receptacle 208. The tabs may be made from rubber, or other like-pliable material to permit such. Additionally, in some instances, a guard may surround the handle 202 and/or the receptacle 208. For example, the guard may be shaped as a half-circular and extend around the handle 202. In some instances, the guard may extend from the flange 306, on one side of the handle 202, to the flange and on another side of the handle 202. Here, the guard may protect the handle 202 from damage and/or may provide a lifting point of the conveyor mat assembly 100. In some instances, the guard in manufactured from a tubular-shaped material.

In some instances, the cord 206 may disengage from between the offset cam locks 902 in order to deploy the conveyor mat 102. Therein, during retracting, the cord 206 may be routed through the offset cam locks 902 via a pulling of the cord 206 through the offset cam locks 902 (e.g., via the handle 202).

Figure 10A:
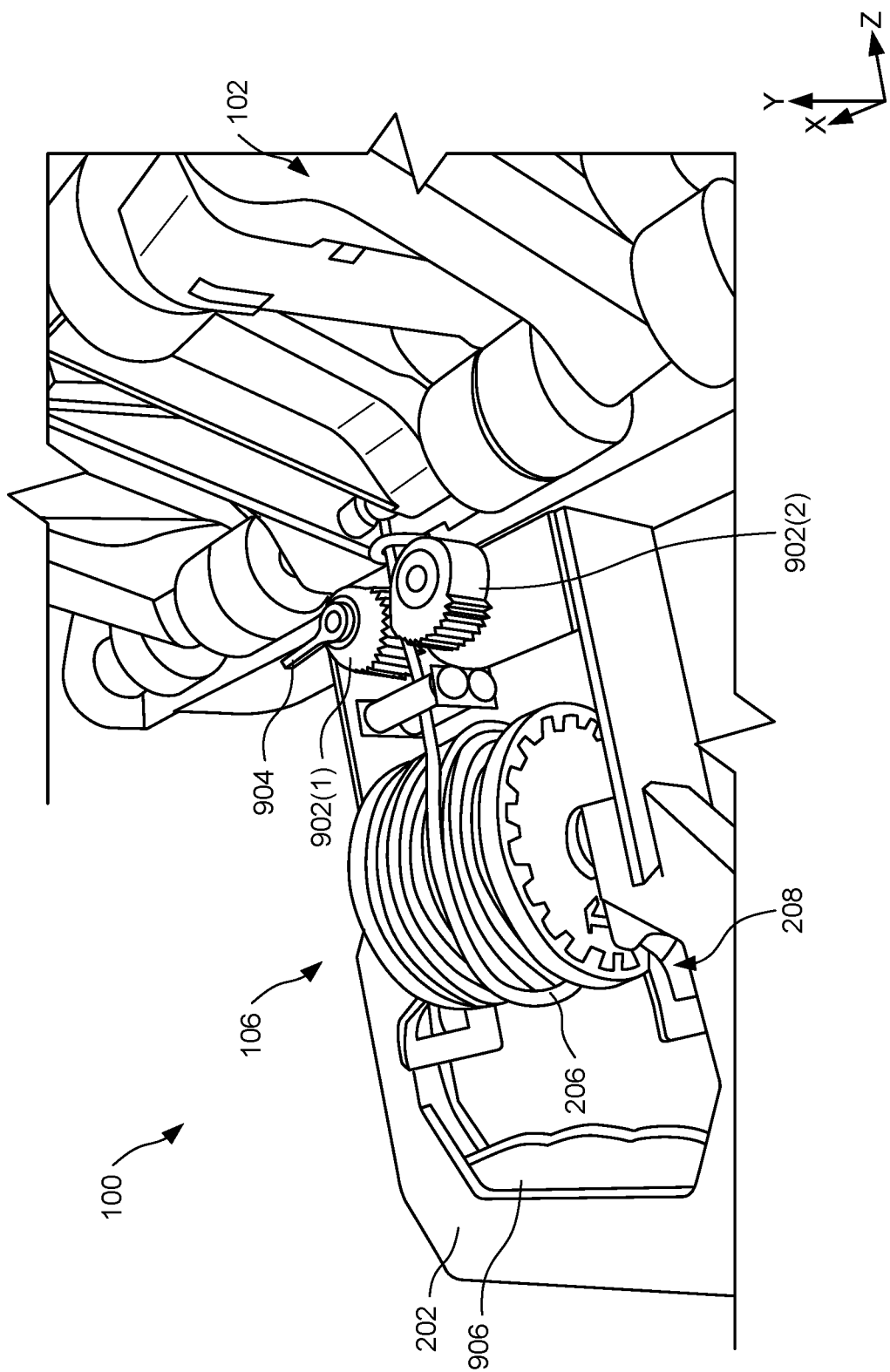
FIGS. 10A-10C illustrate example components of the tensioning system of FIG. 9, according to an example of the present disclosure.
Figure 10B:
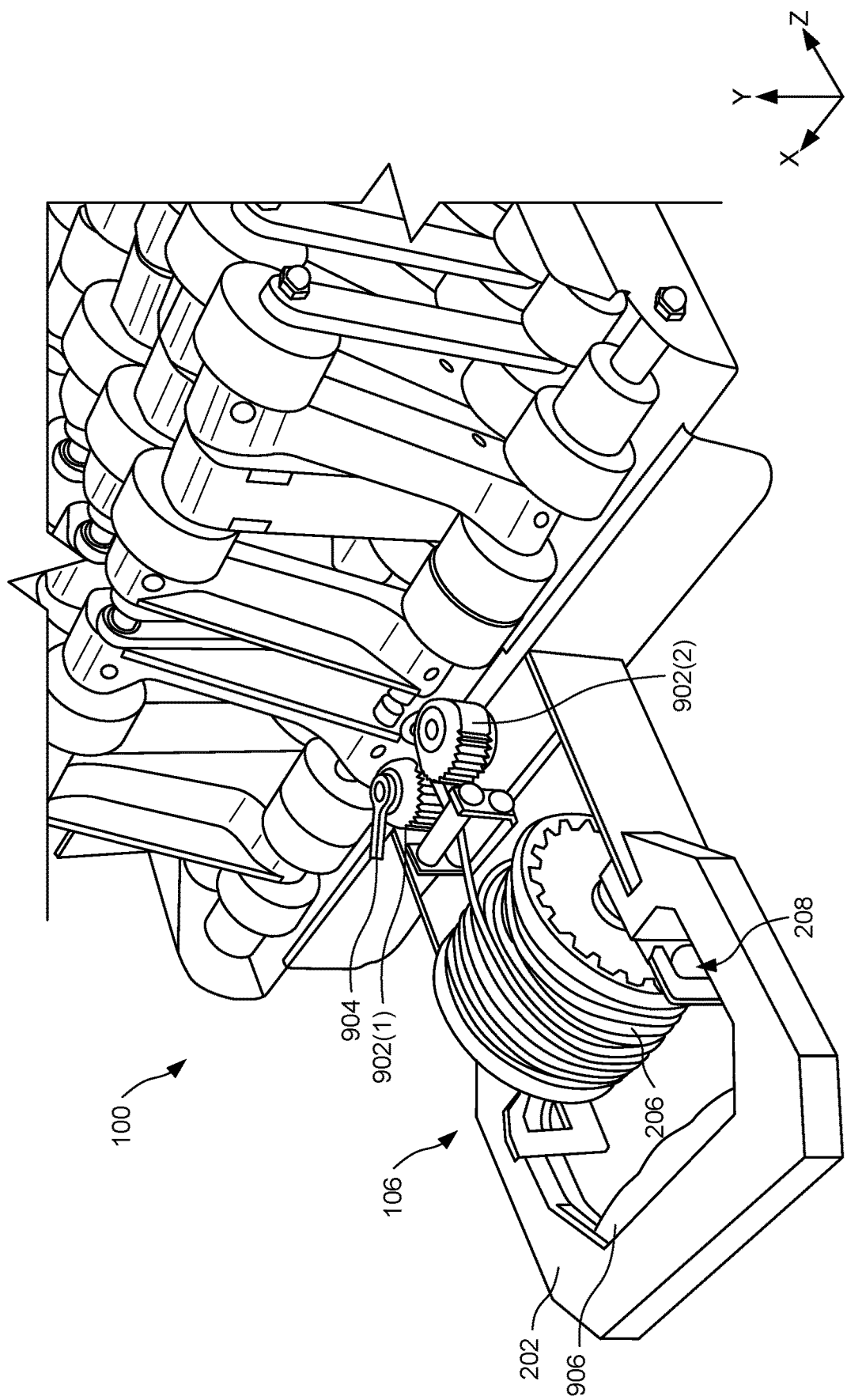
Figure 10C:
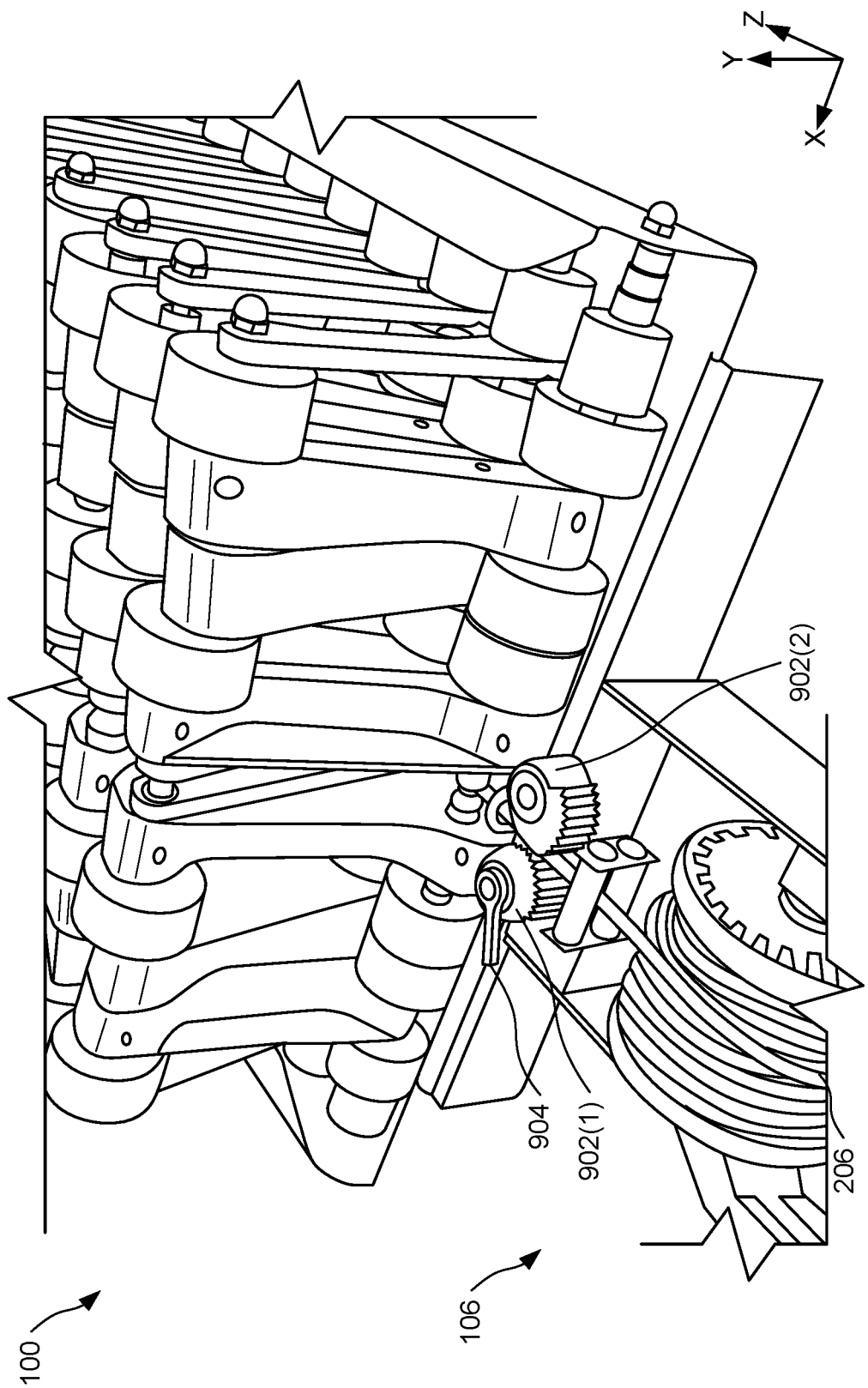

FIGS. 10A-10C illustrate example components of the tensioning system 106 for deploying and retracting the conveyor mat 102, according to examples of the present disclosure.

The tensioning system 106 includes the locking mechanism 900 configured to engage with the cord 206. In some instances, the locking mechanism 900 includes the offset cam locks 902, such as the first offset cam lock 902(1) and the second offset cam lock 902(2). The first offset cam lock 902(1) and the second offset cam lock 902(2) are biased (e.g., via springs) to a closed positioned in which the first offset cam lock 902(1) and the second offset cam lock 902(2) engage the cord 206. For example, the first offset cam lock 902(1) and the second offset cam lock 902(2) may be disposed about posts, springs may reside over the posts, and the first offset cam lock 902(1) and the second offset cam lock 902(2) may rotationally engage with the posts. In some instances, the spring biases the first offset cam lock 902(1) in a counterclockwise direction (e.g., about the Y-axis) and the spring biases the second offset cam lock 902(2) in a clockwise direction (e.g., about the Y-axis).

In the retracted state of the conveyor mat 102, upon actuation of the lever 904, the first offset cam lock 902(1) may rotate to disengage the cord 206 (e.g., increasing a spacing between the first offset cam lock 902(1) and the second offset cam lock 902(2)). In turn, the cord 206 may unwind from the spool 204 (e.g., via a force imparted by the torsional springs). Releasing the lever 904 may bring the first offset cam lock 902(1) and the second offset cam lock 902(2) back into contact with the cord 206, thereby preventing deployment of the conveyor mat 102. The lever 904 may be used to deploy the conveyor mat 102 by various lengths depending on the application. Moreover, rotating the lever 904 may be used to throttle deployment of the conveyor mat 102. For example, moving the lever 904 to an extreme end (e.g., rotated a maximum amount in the counterclockwise direction) may quickly deploy the conveyor mat 102, whereas moving the lever 904 minimally may maintain an engagement with the offset cam locks 902, but allow the cord 206 to pass therethrough to permit the conveyor mat 102 to deploy.

In some instances, the first offset cam lock 902(1) and the second offset cam lock 902(2) include teeth (e.g., serrations, grooves, etc.) that engage with the cord 206. The teeth may prevent slippage of the cord 206 through the first offset cam lock 902(1) and the second offset cam lock 902(2). As further shown, the first offset cam lock 902(1) and the second offset cam lock 902(2) may be interposed between the rollers 908 and the proximal end 300 of the conveyor mat 102.

The handle 202 is shown including the switch 906 for locking the spool 204. After, during, or before the handle 202 is removed from the receptacle 208, the switch 906 may be pressed (e.g., held down) to lock the spool 204. The personnel may then pull on the handle 202 to advance the cord 206 through the first offset cam lock 902(1) and the second offset cam lock 902(2). That is, even when the lever 904 is not actuated, the cord 206 may be pulled through the first offset cam lock 902(1) and the second offset cam lock 902(2). In such instances, the first offset cam lock 902(1) and the second offset cam lock 902(2) may slightly deflect (e.g., rotate). Moreover, once the personnel has finished pulling, and no longer applies a force to the handle 202, the first offset cam lock 902(1) and the second offset cam lock 902(2) may engage the cord 206 to resist the conveyor mat 102 transitioning to the deployed state.

Figure 11A:
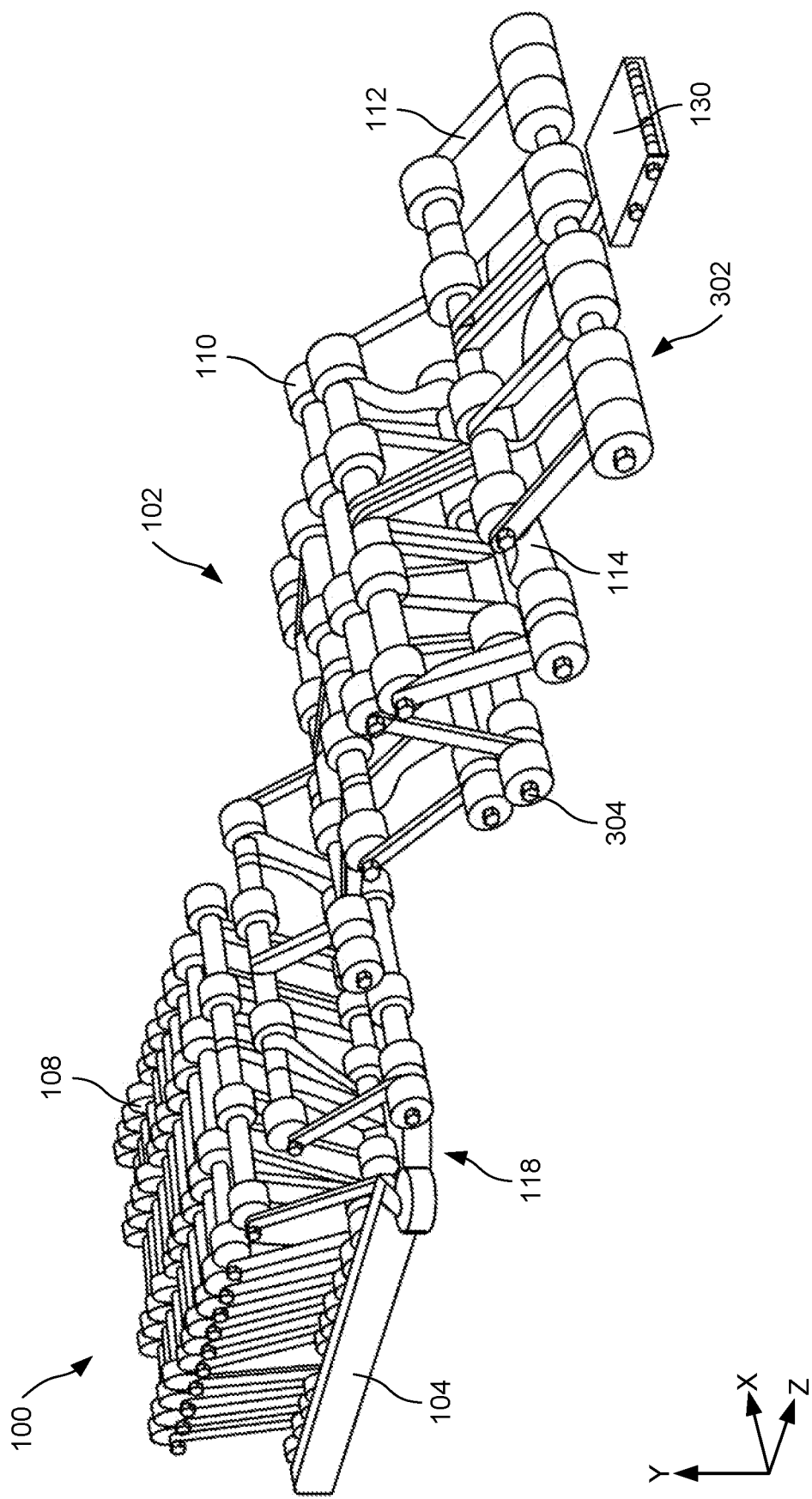
FIGS. 11A-11C illustrate an example deployment of the conveyor mat of FIG. 1, according to an example of the present disclosure.
Figure 11B:
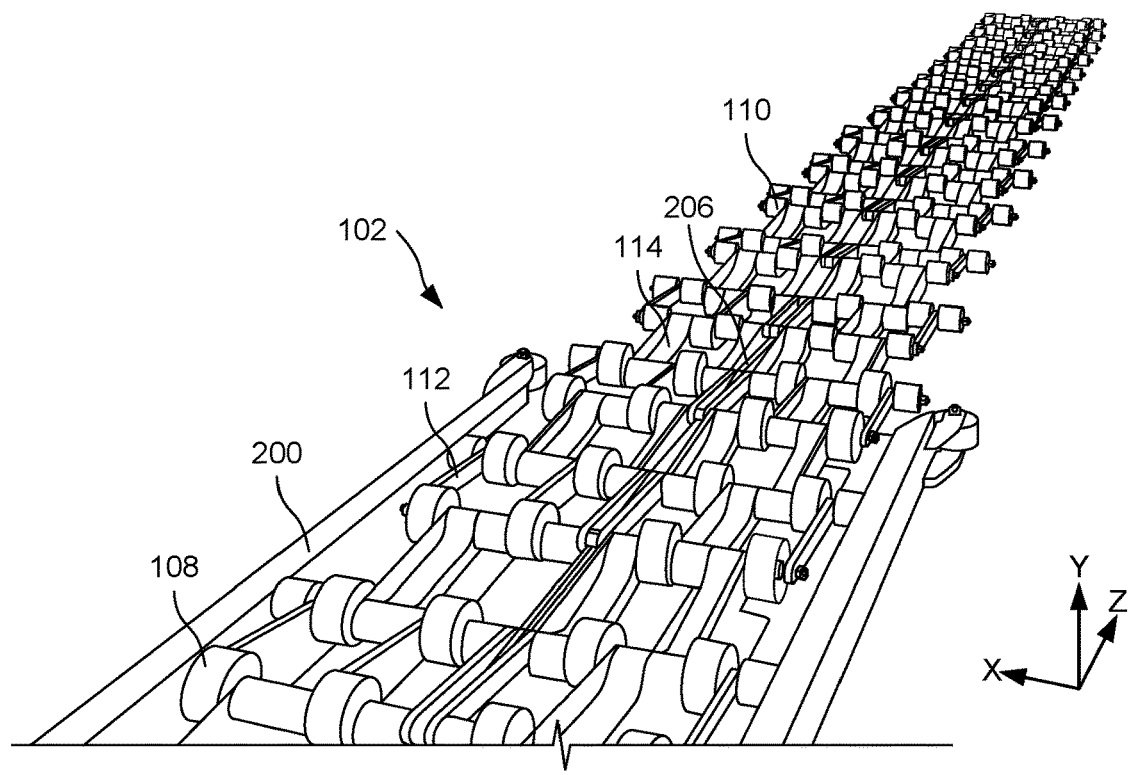
Figure 11C:
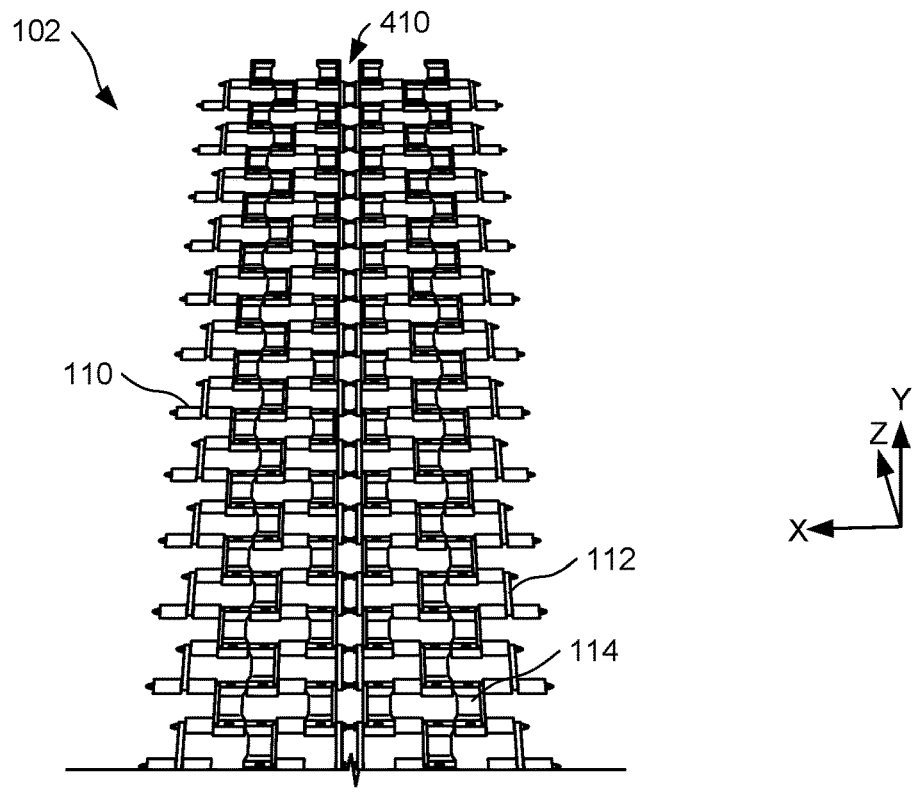

FIGS. 11A-11C illustrate an example deployment of the conveyor mat 102, according to examples of the present disclosure. In FIG. 11A, the conveyor mat 102 is shown being deployed (e.g., transitioning to the deployed state), whereas in FIGS. 11B and 11C, the conveyor mat 102 is shown being fully deployed.

In the retracted state, upon actuation of the lever 904, the torsional springs coupled to linkages 112 and/or the supports 114 impart motion to the conveyor mat 102. For example, given that the cord 206 couples to the distal end 302 of the conveyor mat 102, movement of the lever 904 to a released position allows the distal end 302 to extend past the second end 118 of the frame 104. In other words, the conveyor mat 102 is permitted to be released from the frame 104. Here, the energy stored by the torsional springs is imparted to the supports 114 to extend the supports 114 (as well as the linkages 112, first rollers 108, and second rollers 110) from the frame 104. During this instances, the linkages 112 and the supports 114 transition to a horizontal alignment and unfold from the frame 104.

The linkages 112 and the supports 114 are shown coupled in an end-to-end fashion, via the axles 304. Additionally, the linkages 112, the supports 114, the first rollers 108, and second rollers 110 are coupled in a side-by-side fashion, along the axles 304. The cord 206 routes along the spine 410 of the conveyor mat 102, over the hubs. As will be explained herein, the distal end 302 of the conveyor mat 102 includes the pedal 130 that allows a length of the conveyor mat 102 proximate to the distal end 302 to be retracted without use of the tensioning system 106 (e.g., without actuating the lever 904).

Figure 12A:
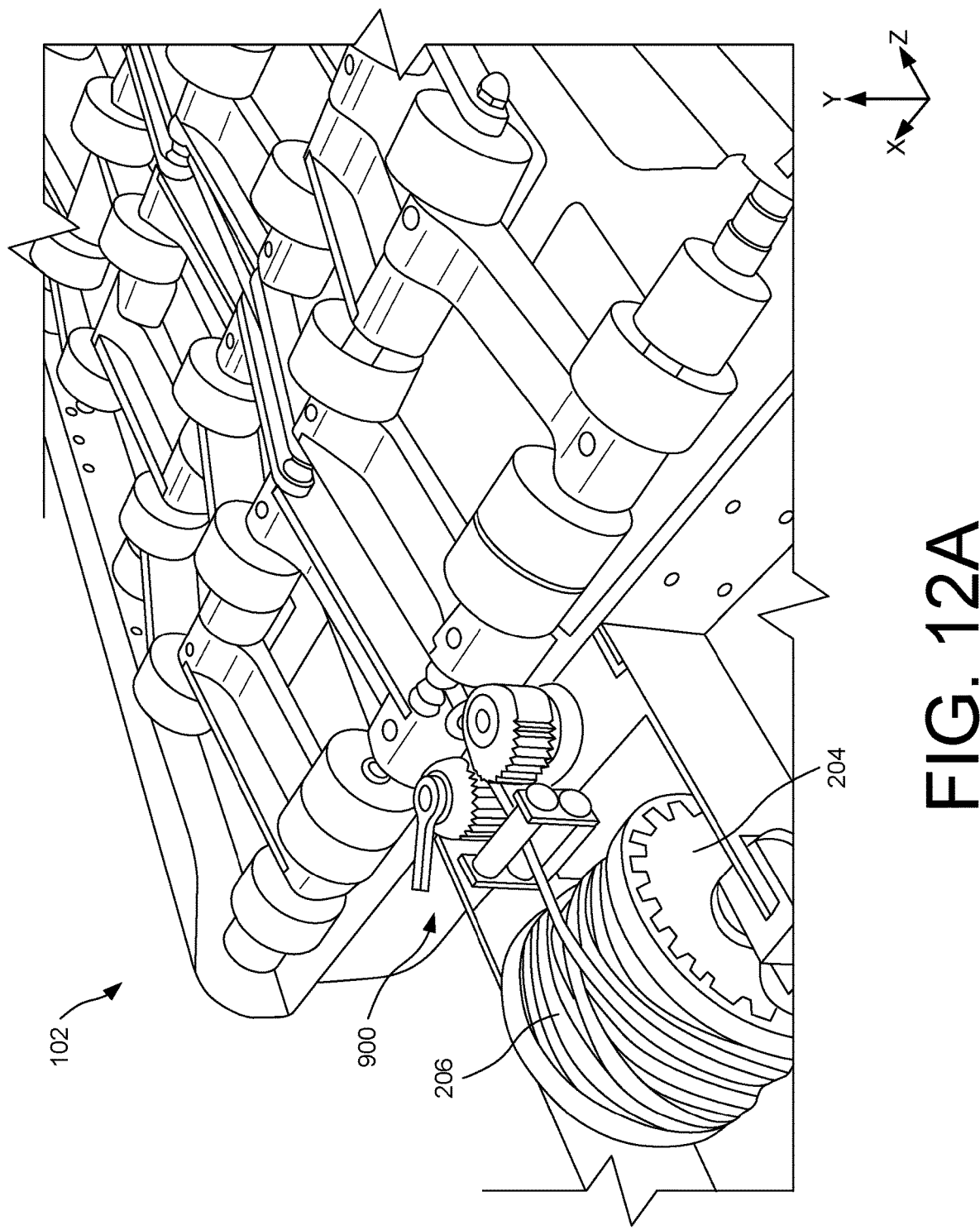
Figure 12B:
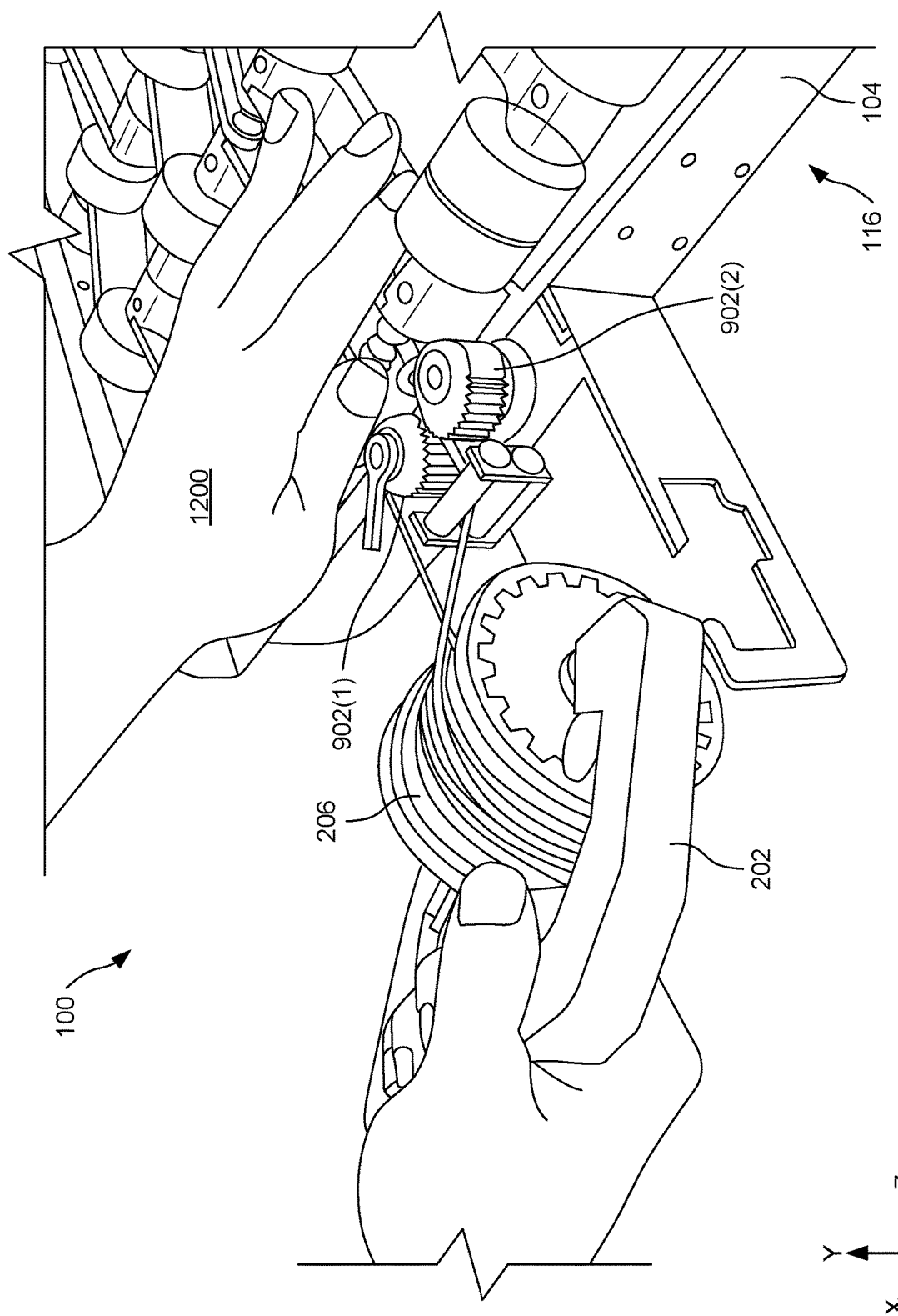

FIGS. 12A-12C illustrate an example retraction of the conveyor mat 102 using the tensioning system 106, according to examples of the present disclosure. More particularly, FIGS. 12A-12C illustrate an example sequence for retracting the conveyor mat 102.

In FIG. 12A the conveyor mat 102 is shown in the deployed state and the locking mechanism 900 is shown engaging with the cord 206. In this position, the offset cam locks 902 engage with the cord 206. Additionally, the cord 206 is wound tight around the spool 204 via a coil spring, for example, in the spool 204.

In FIG. 12B a personnel 1200 may grip the handle 202 and actuate the switch 906 (e.g., pull on the switch 906). In this instance, the spool 204 may lock and be prevented from rotating. With the switch 906 actuated, the personnel 1200 may pull on the handle 202 in a direction away from the first end 116 of the frame 104. Given the locked nature of the spool 204, the cord 206 may be pulled through the offset cam locks 902. In some instances, the offset cam locks 902 may slightly deflect (e.g., rotate) during advancement of the cord 206 therethrough. As the personnel 1200 pulls on the handle 202, releasing the switch 906 may permit the cord 206 to be wound around the spool 204 (e.g., assuming the personnel 1200 permits such movement by moving their hand towards the first end 116 of the frame 104). However, the cord 206 remains secured within the offset cam locks 902 to prevent the conveyor mat 102 transitioning to the deployed state (e.g., undoing the pulling work by the personnel 1200). That is, the cord 206 may not be pulled in an opposite direction through the offset cam locks 902.

In FIG. 12C which may be simultaneous with the personnel 1200 pulling on the handle 202, the distal end 302 of the conveyor mat 102 is shown being pulled closer to the frame 104. For example, the conveyor mat 102, when transitioning to the retracted state, may be in a folded like fashion where the linkages 112 and the supports 114 are in a vertical arrangement.

After retracting a portion of the length of the conveyor mat 102, and after the slack is taken up in the spool 204, the personnel 1200 may again pull on the handle 202 with the switch 906 engaged. Here, another portion of the length of the conveyor mat 102 may be pulled through the offset cam locks 902. During this instance, another portion of the length of the conveyor mat 102 may be folded. This process may repeat until the length of the conveyor mat 102 is pulled into the frame 104. In some instances, the pulling force required to pull the conveyor mat 102 to the retracted state may increase as the distal end 302 of the conveyor mat 102 nears the frame 104.

Figure 13:
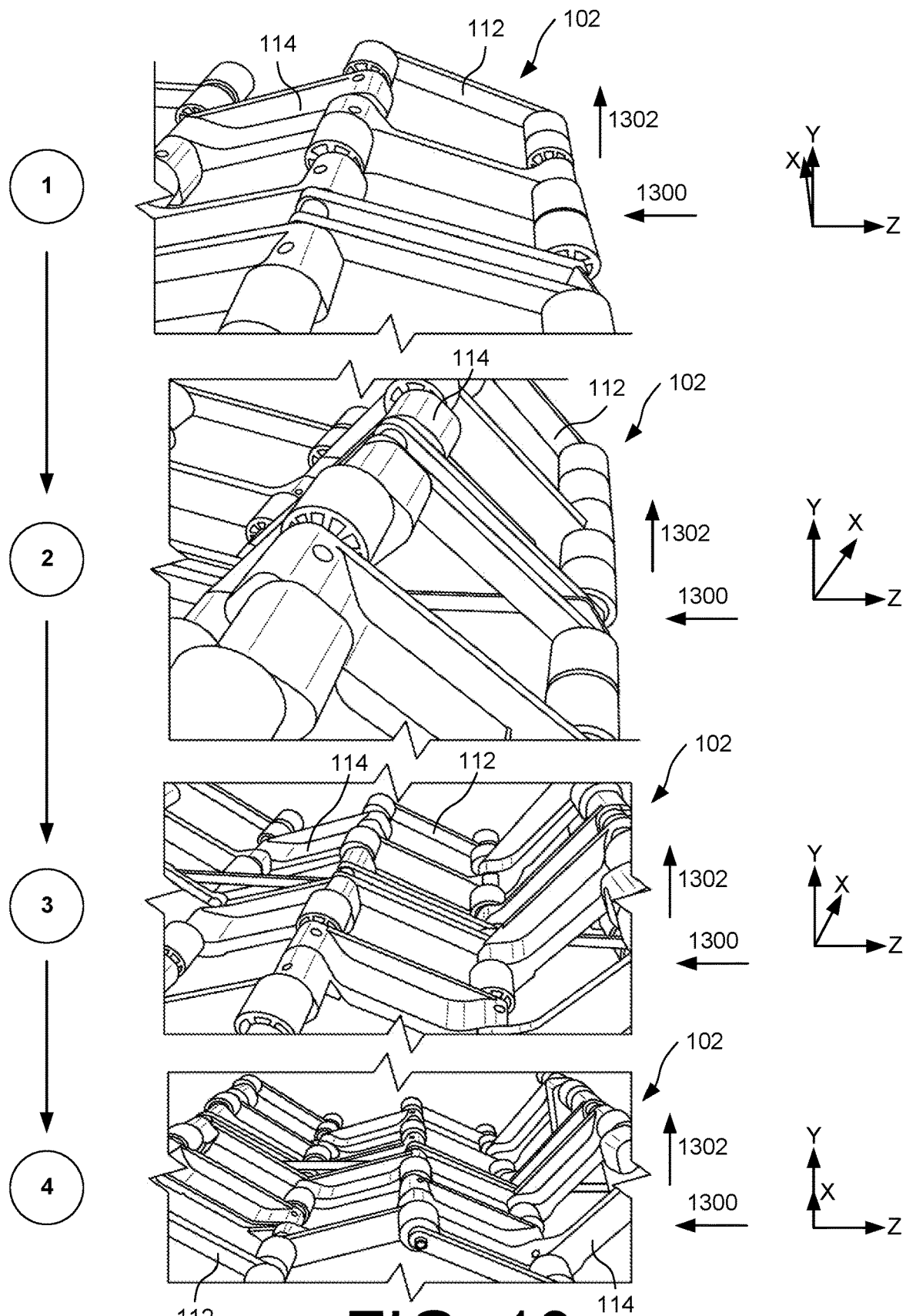
FIG. 13 illustrates an example retraction of the conveyor mat of FIG. 1, according to an example of the present disclosure.

FIG. 13 illustrates a coupling and operation of the linkages 112 and the supports 114 during transitioning of the conveyor mat 102 to the retracted state, according to examples of the present disclosure. More particularly, FIG. 13 illustrates an example sequence showing a movement of the linkages 112 and the supports 114 during retraction of the conveyor mat 102.

At "1," following a pulling of the handle 202 (with the switch 906 actuated) the conveyor mat 102 may move in a first direction 1300. For example, the coupling of the cord 206 to the distal end 302 of the conveyor mat 102 may impart a force applied by the personnel to the distal end 302. In some instances, the first direction 1300 may cause the distal end 302 to remain on the floor of the vehicle, but pulls the distal end 302 closer to the frame 104 (e.g., in the horizontal direction). During this time, given a coupling of the linkages 112 and the supports 114, a portion of the conveyor mat 102 may move in a second direction 1302 (e.g., in the vertical direction).

At "2," continuing to pull on the cord 206 further advances the distal end 302 in the first direction 1300, and extends the portion of the conveyor mat 102 in the second direction 1302. In other words, the sections of the conveyor mat 102 may begin to fold such that the linkages 112 and the supports 114 are arranged in the vertical orientation.

As shown at "3" and at "4," adjacent rows of the conveyor mat 102 may be translate in the second direction 1302. That is, alternating rows may move in the second direction 1302 to form the folded sections. The rows that do not move in the second direction 1302 may be slid across the floor of the vehicle towards the frame 104 (e.g., in the first direction 1300). In some instances, the control of the rows of the conveyor mat 102 (e.g., in the first direction 1300 and the second direction 1302) may be accomplished, at least in part, via the routing of cord 206 over the axles 304 and the hubs 800. For example, the cord 206 may be routed in an over under fashion along the length of the conveyor mat 102 such that pulling of the cord 206 causes adjacent rows of the conveyor mat 102 to move in the first direction 1300 and the second direction 1302, respectively.

Figure 14A:
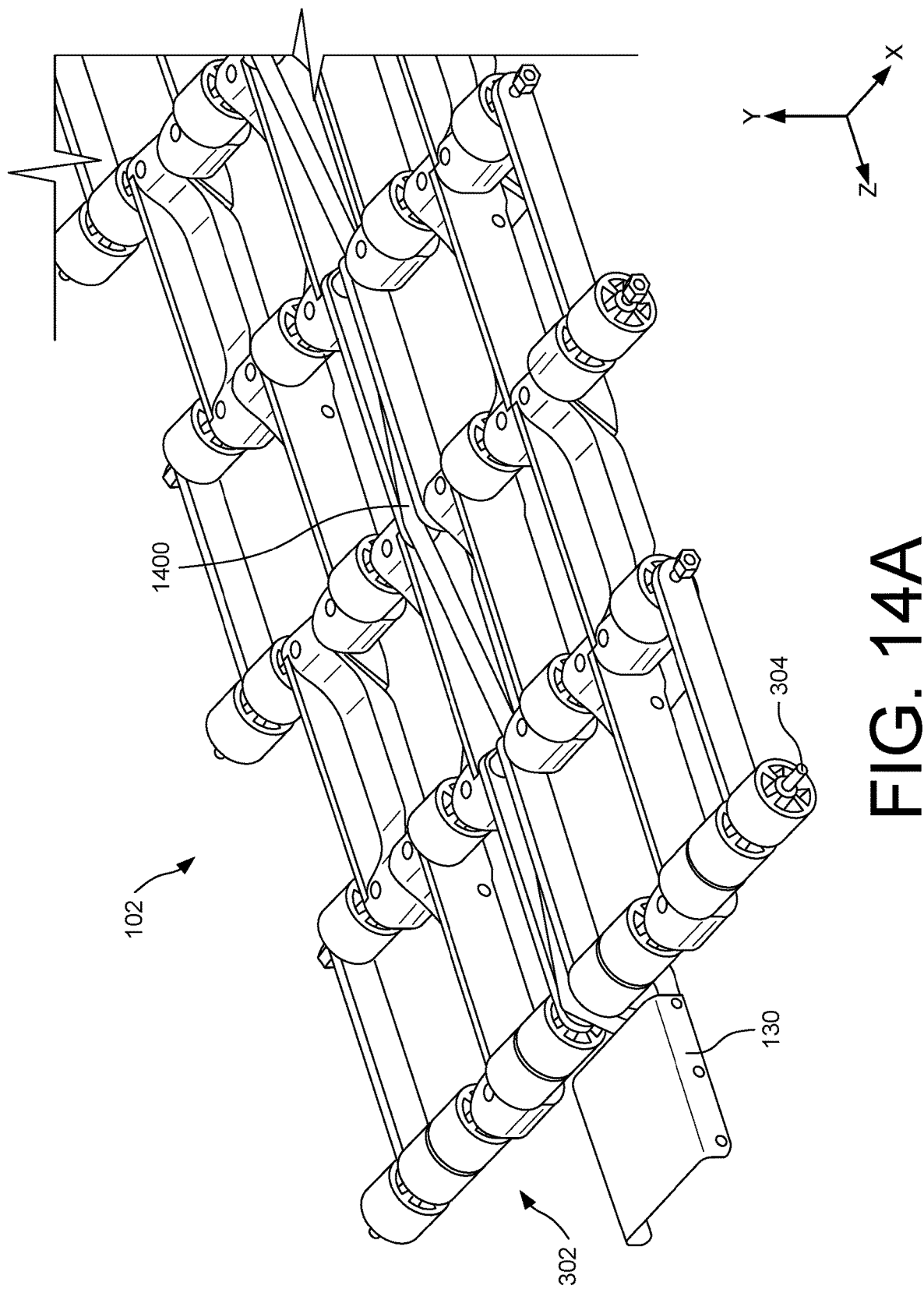
FIGS. 14A-14C illustrate an operation of the linkage of FIG. 6 and the support of FIG. 7 during a retraction of the conveyor mat of FIG. 1, according to an example of the present disclosure.
Figure 14B:
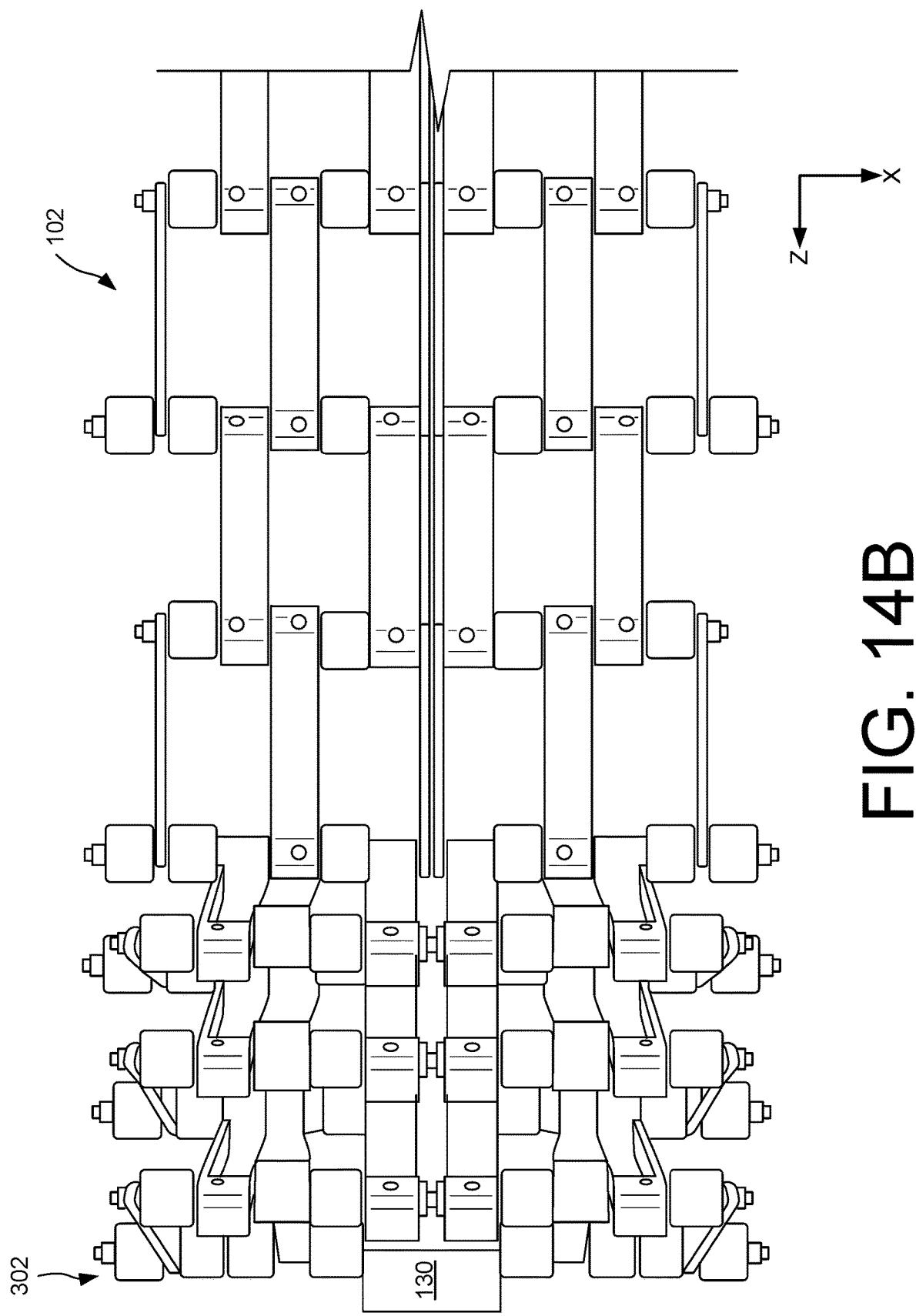
Figure 14C:
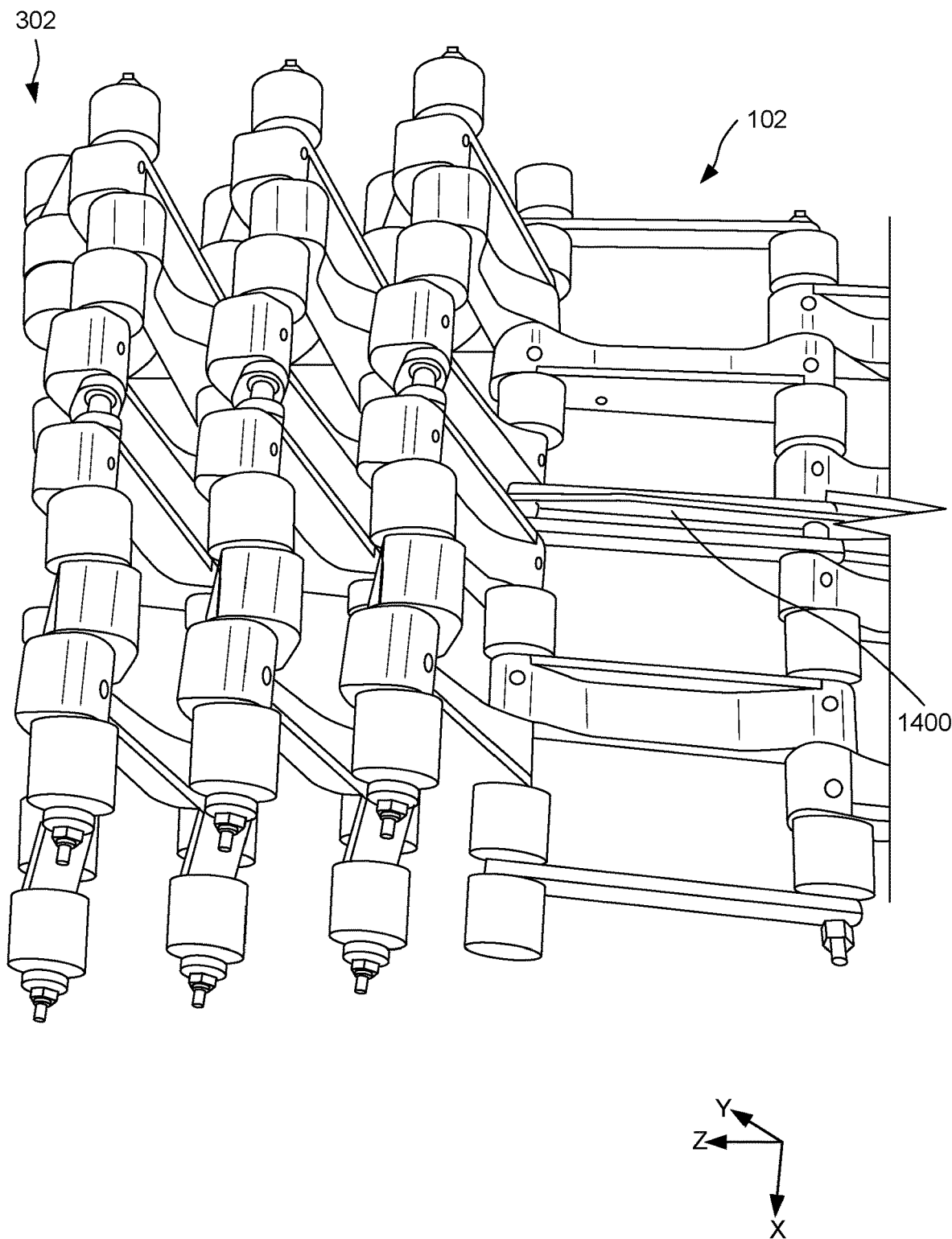

FIGS. 14A-14C illustrate a retraction of the conveyor mat 102, according to examples of the present disclosure. In some instances, FIGS. 14A-14C illustrate a "kick to close" mechanism of the conveyor mat 102 that permits the personnel 1200 to retract a portion of the length of the conveyor mat 102 proximate to the distal end 302.

The conveyor mat 102 includes the pedal 130 located at the distal end 302. In some instances, the pedal 130 may be coupled to a bar 1400 that extends along a portion of the length of the conveyor mat 102. The bar 1400 may route along the spine 410, under and/or over the axles 304 and/or the hubs 800. In some instances, the bar 1400 assists in controlling movement of the rows of the conveyor mat 102 in the first direction 1300 and the second direction 1302 such that the conveyor mat 102 may fold to the retracted state. In some instances, an end of the cord 206 not coupled to or wound about the spool 204 may be coupled to the bar 1400. In such instances, the cord 206 may not couple to the distal end 302 of the conveyor mat 102, but instead, may couple to the bar 1400 in a direction spaced apart from the distal end 302. The pedal 130 may couple to an axle 304 at the distal end 302 for imparting motion to the conveyor mat 102 during retraction.

The personnel 1200 may step on the pedal 130 and push the pedal 130 towards the frame 104. The motion imparted by the personnel 1200 may be in the first direction 1300. In response, the conveyor mat 102 may fold such that the linkages 112 and the supports 114 are aligned in the vertical position. In some instances, the personnel 1200 may retract the conveyor mat 102 a predetermined length, which may be approximately four feet. In some instances, this portion of the length of the conveyor mat 102 may represent the third portion of the length. Upon the conveyor mat 102 being retracted the predetermined length, the personnel 1200 may remove their foot and the conveyor mat 102 may remain in the retracted state. In some instances, this may be accomplished via the torsional springs in the third portion of the length having insufficient spring constants to deploy the conveyor mat 102. However, when the personnel 1200 desires to fully deploy the conveyor mat 102, the personnel 1200 may step on the pedal 130 to pull the distal end 302 of the conveyor mat 102 away from the frame 104.

Figure 15:
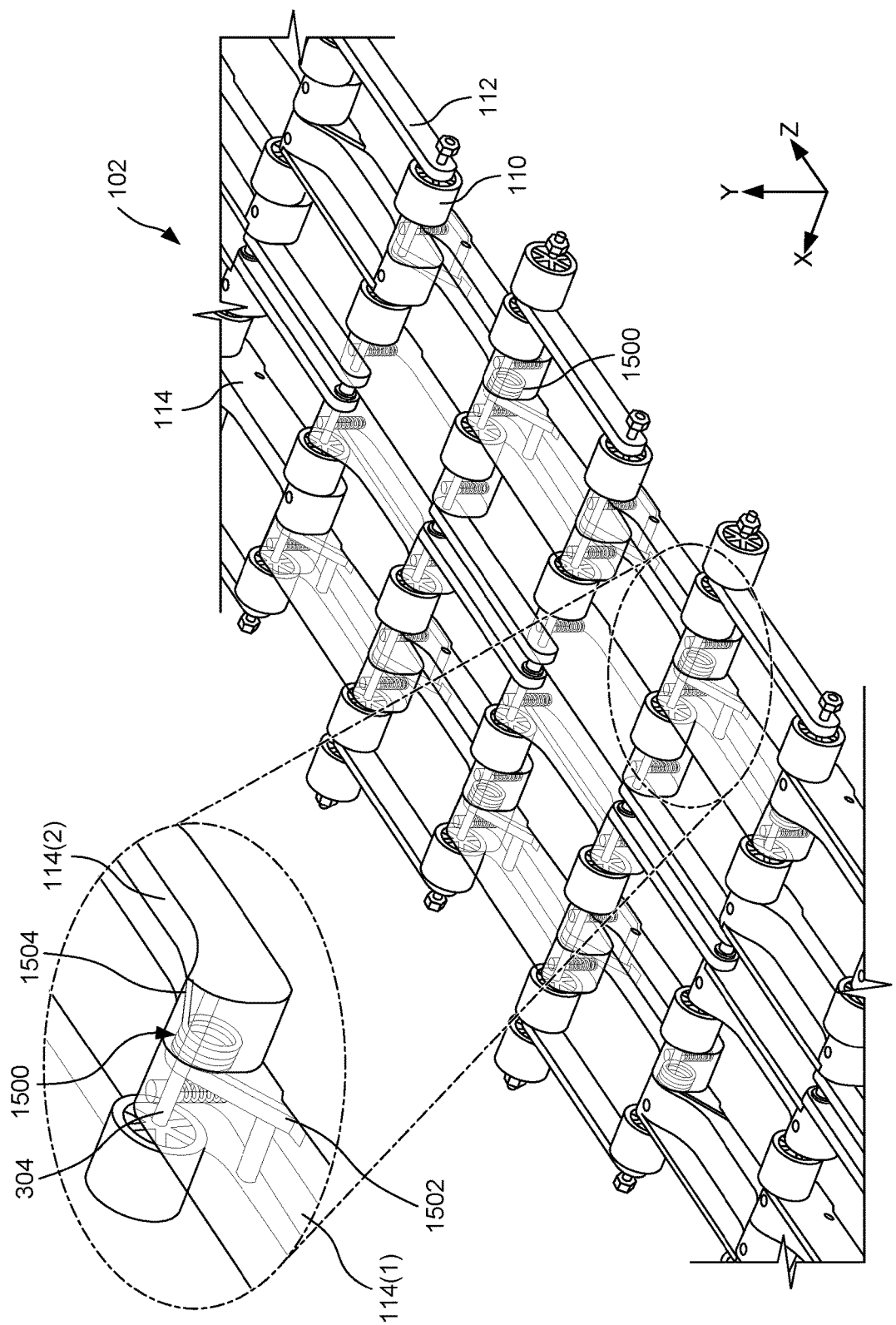
FIG. 15 illustrates an example mechanism to deploy the conveyor mat of FIG. 1, according to an example of the present disclosure.

FIG. 15 illustrates example torsional springs 1500 that engage with the supports 114 for deploying the conveyor mat 102, according to examples of the present disclosure. As explained herein, along the length of the conveyor mat 102, the torsional springs 1500 may engage with the linkages 112 and/or the supports 114 to force the conveyor mat 102 to the deployed state.

In some instances, the torsional springs 1500 act on the supports 114 to deploy the conveyor mat 102. A detailed view of an engagement between the torsional spring 1500 and the supports 114 is shown. For example, a first prong 1502 of the torsional spring 1500 may engage or otherwise reside within a first arm (e.g., the first arm 732 or the second arm 734) of a first support 114(1), while a second prong 1504 of the torsional spring 1500 may engage or otherwise reside within a second arm (e.g., the first arm 732 or the second arm 734) of a second support 114(2). In the deployed state, the first prong 1502 and the second prong 1504 are extended outward. In the retracted state, however, the first prong 1502 and the second prong 1504 are folded inward to store mechanical energy necessary to move the conveyor mat 102 to the deployed state. That is, in the retracted state, the torsional springs 1500 may impart force to the first support 114(1) and the second support 114(2). However, such force is restrained by the locking mechanism 900 engaging with the cord 206 in the retracted state. As the locking mechanism 900 is released, the force of the torsional spring 1500 is permitted to act on the supports 114 to extend the conveyor mat 102. Here, the first prong 1502(1) acts on the first support 114(1) and the second prong 1504(2) acts on the second support 114(2) to move the first support 114(1) and the second support 114(2). During this instance, the first support 114(1) and the second support 114(2) rotate about the axle 304 to a horizontal position.

In some instances, the torsional springs 1500 are housed within recesses and/or arms of the supports 114, and which receive the first prong 1502 and the second prong 1504, respectively. The recesses may maintain an engagement between the supports 114, the first prong 1502, and the second prong 1504, respectively. In some instances, each row of the conveyor mat 102 may have two torsional springs 1500. However, more than or less than two torsional springs 1500 may be included. In some instances, the amount of torsional springs 1500 may adjust a rate at which the conveyor mat 102 is deployed and/or a force applied to the supports 114 along a row.

In some instances, the conveyor mat 102 may include different types of torsional springs 1500 that impart different amounts of torque along the length of the conveyor mat 102. For example, a first portion of the length of the conveyor mat 102, or a first number of the supports 114, may engage with first torsional springs having a first amount of torque or a first spring constant (e.g., twelve pounds of torque). A second portion of the length of the conveyor mat 102, or a second number of the supports 114, may engage with second torsional springs having a second amount of torque or a second spring constant that is less than the first amount of torque or the first spring constant (e.g., ten pounds of torque). A third portion of the length of the conveyor mat 102, or a third number of the supports 114, may engage with third torsional springs having a third amount of torque or a third spring constant that is less than the second amount of torque or the second spring constant (e.g., seven pounds of torque). The first portion of the length may be disposed at the proximal end 300 of the conveyor mat 102 (e.g., extending from the proximal end 300 towards the distal end 302), the third portion of the length may be disposed at the distal end 302 of the conveyor mat 102 (e.g., extending from the distal end 302 towards the proximal end 300), and the second portion of the length may be disposed between the first portion of the length and the second portion of the length.

Figure 16:
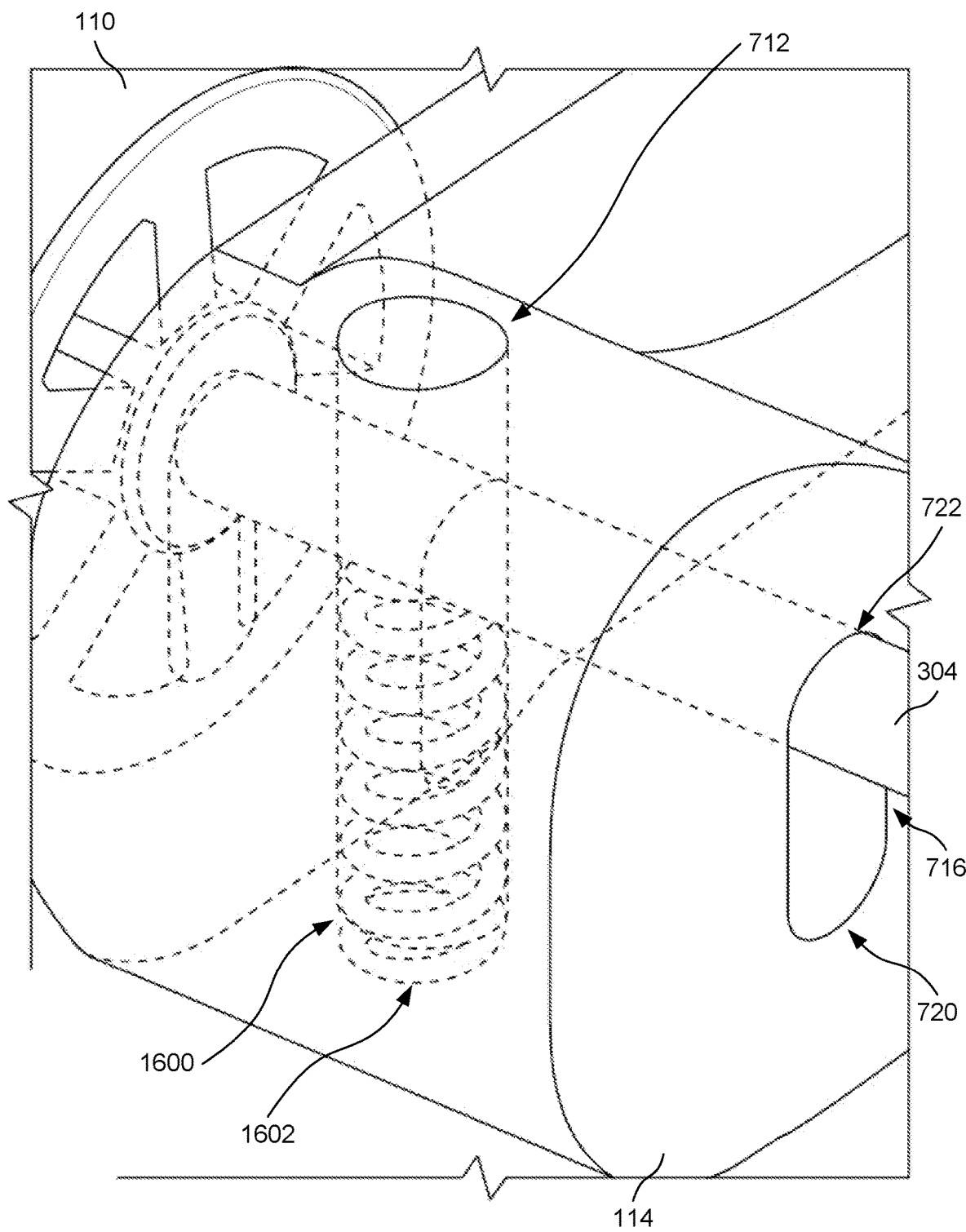
FIG. 16 illustrates an example engagement between axles of the conveyor mat of FIG. 1 with the linkage of FIG. 6 and the support of FIG. 7, according to an example of the present disclosure.

FIG. 16 illustrates example coil spring 1600 that engage with the axles 304 and the supports 114 for allowing personnel to safely step on the conveyor mat 102, according to examples of the present disclosure. Portions of the coil spring 1600, the axle 304, and the support 114 are show in dashed lines in order to illustrate the coupling between the coil spring 1600, the axle 304, and the support 114, respectively. Although discussed herein as being within the first slot 716, it is to be understood that the coil spring 1600 and axle 304 may engage and operate within the second slot 718 in a similar manner.

The axle 304 is shown disposed through the first slot 716, through a width of the support 114. The coil spring 1600 extends from an end 1602 of the first channel 712 (e.g., spaced apart from an opening of the first channel 712 on the top surface 708) to engage with a bottom of the axle 304. The coil spring 1600 may be inserted into the first channel 712 via an opening on the top surface 708. Additionally, the first channel 712 and the first slot 716 may be in communication with one another such that the coil spring 1600 is permitted to engage with the axle 304.

As shown in FIG. 16, the axle 304 is biased towards the top end 722 of the first slot 716 via the coil spring 1600. In other words, the coil spring 1600 is permitted to extend, within the first channel 712 to bias the axle 304 to the top end 722. However, the coil spring 1600 may be compressed upon application of a certain or predetermined amount of weight. For example, the personnel may step on the support 114 (and/or the linkage 112, the first rollers 108, the second rollers 110, etc.) such that the coil spring 1600 is compressed within the first channel 712. In this instance, the axle 304 may be advanced towards the bottom end 720 of the first slot 716. The axle 304 is permitted to translate within the first slot 716 until bottoming out at the bottom end 720. At this position, however, the first rollers 108 and/or the second rollers 110 may contact the floor of the vehicle. The floor may resist rotation (e.g., via friction) of the first rollers 108 and/or the second rollers 110 to provide a platform on which the personnel may stand (e.g., which loading packages into the vehicle and/or onto shelves of the vehicle). When the personnel steps off the conveyor mat 102, the coil spring 1600 biases the axle 304 towards the top end 722.

In some instances, the amount of weight required to compress the coil springs 1600, and to deflect the axles 304, may be based on the amount of coil springs 1600 in contact with the foot of the personnel, for example. For example, generally, the greater number of coil springs 1600 engaged by the personnel, the greater amount of weight may be required to compress the coil springs 1600.

In some instances, given the safe step features of the conveyor mat 102, the linkages 112 and/or supports 114 may not be completely horizontal in the deployed state along the length of the conveyor mat 102. In some instances, along the length of the conveyor mat 102, the linkages 112 and/or supports 114 may be disposed at 105 degrees or 110 degrees. Upon being stepped on, for example, the linkages 112 and/or supports 114 may be horizontally aligned (e.g., 180 degrees).

Figure 17:
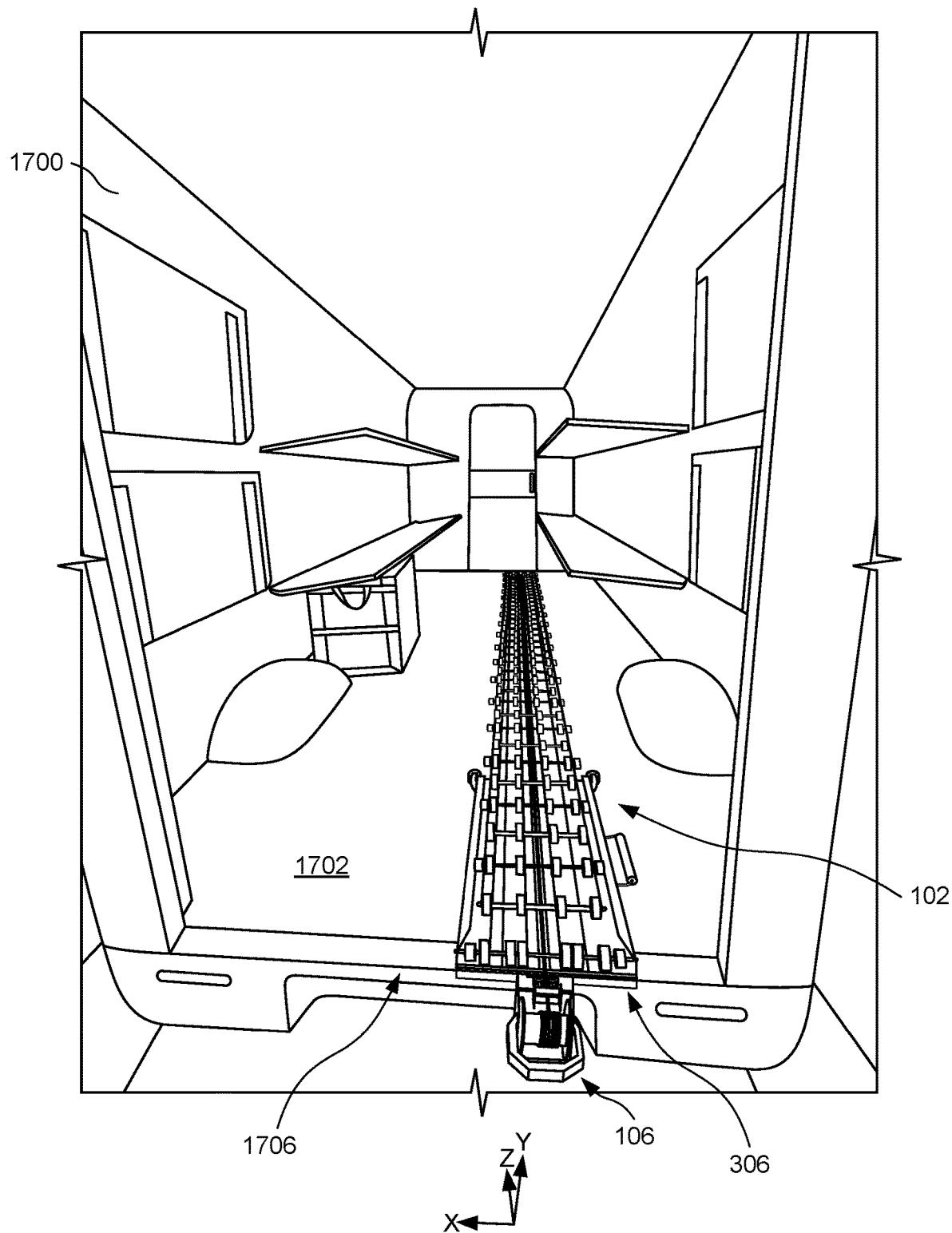
FIG. 17 illustrates the conveyor mat of FIG. 1 being deployed within an example vehicle, according to an example of the present disclosure.

FIG. 17 illustrates the conveyor mat 102 being deployed with an example vehicle 1700, according to examples of the present disclosure. For example, the conveyor mat assembly 100 may be placed onto a vehicle floor 1702 of the vehicle 1700, with the second end 118 of the frame 104 (or the distal end 302 of the conveyor mat 102) being oriented towards an interior of the vehicle 1700. The flange 306 of the frame 104 may also engage with an end 1706 of the vehicle floor 1702. Such engagement may prevent the conveyor mat assembly 100, when deployed, translating into the interior of the vehicle 1700.

After placement of the conveyor mat assembly 100, personnel 1200 may deploy the conveyor mat 102 via the tensioning system 106. For example, the personnel 1200 may rotate the switch 906 such that the offset cam locks 902 disengage with the cord 206. In turn, the torsional springs 1500 cause the conveyor mat 102 to deploy. Although FIG. 17 illustrates that the conveyor mat 102 is fully deployed, the conveyor mat 102 may be less than fully deployed into the vehicle 1700. For example, depending on the length of the conveyor mat 102 desired, the personnel 1200 may only actuate the switch 906 for a certain period of time (prior to the conveyor mat 102 being fully deployed) that corresponds to the desired length.

Figure 18:
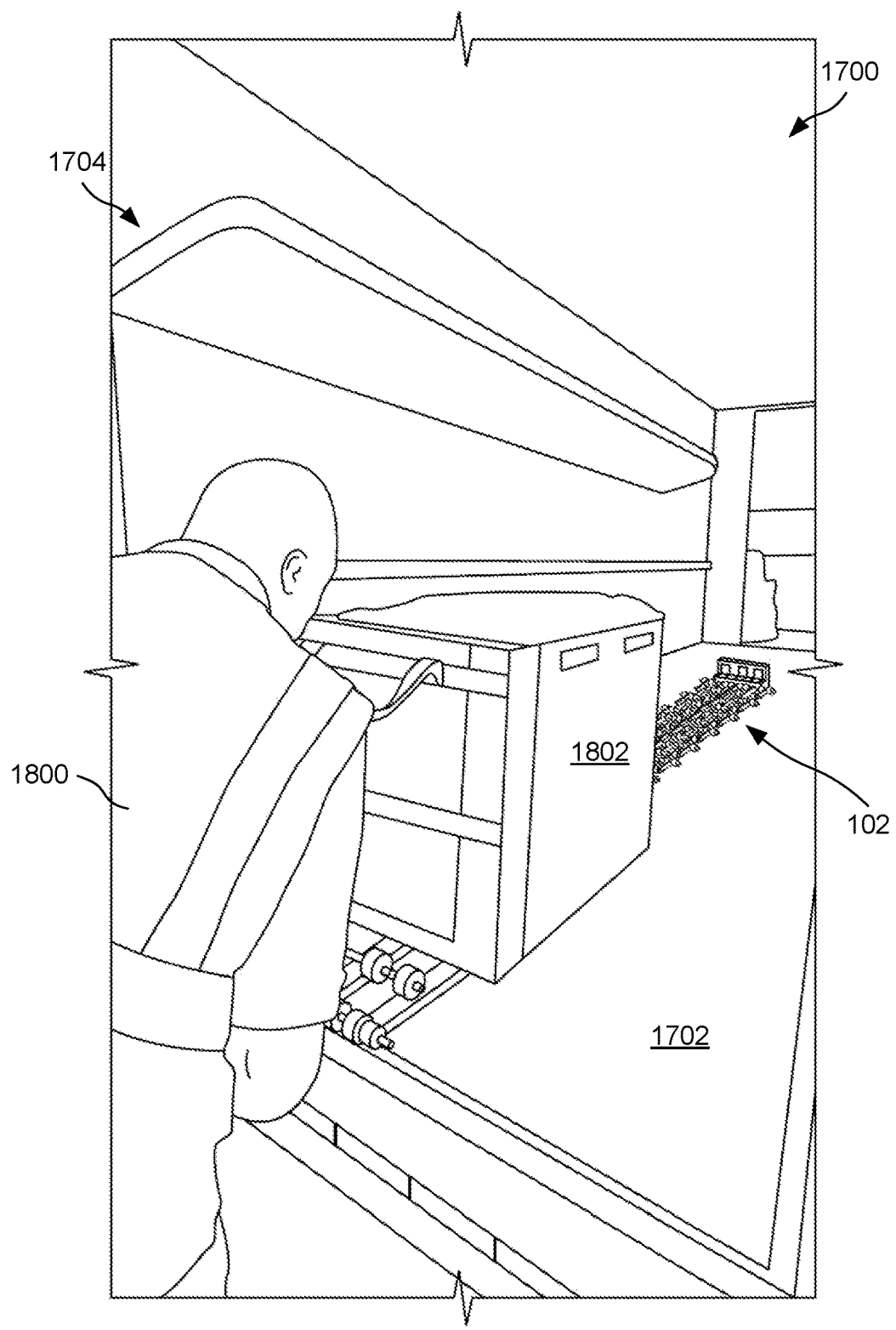
FIG. 18 illustrates the conveyor mat of FIG. 1 being used by a personnel to load packages into an example vehicle, according to an example of the present disclosure.

FIG. 18 illustrates the conveyor mat 102 being used to load packages 1802 into the vehicle 1700, according to examples of the present disclosure. For example, once the conveyor mat 102 is deployed, a personnel 1800 may load the packages 1802 onto the conveyor mat 102. In some instances, bins, containers, bags, or other vessels containing the packages 1802 may be placed onto the conveyor mat 102. This may allow the personnel 1800, for example, to load a container of packages 1802 onto the vehicle 1700 at a single instance.

Once placed on the conveyor mat 102, the personnel 1800 may push the package 1802 across the rolling surface of the conveyor mat 102 (i.e., created by the first rollers 108 and the second rollers 110). Therein, the personnel 1800 may load another package (or container) such that the conveyor mat 102 becomes full. Therein, The personnel 1800 may enter the vehicle 1700 and load the packages 1802 onto shelves 1704 within the vehicle 1700. Accordingly, the personnel 1800 may load the conveyor mat 102 with the packages 1802, and thereafter, may enter the vehicle 1700 to place the packages 1802 on the shelves 1704.

Figure 19:
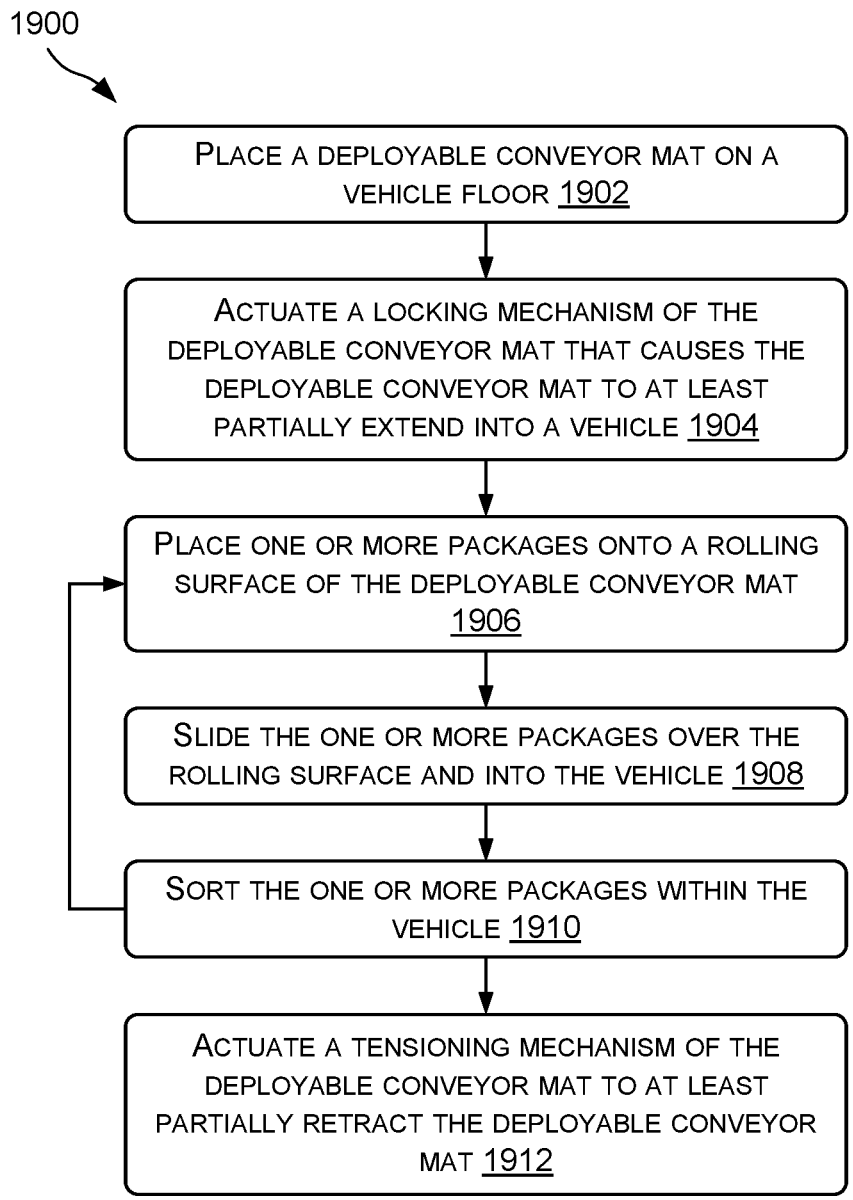
FIG. 19 illustrates an example process for deploying and retracting the conveyor mat of FIG. 1, according to an example of the present disclosure.

FIG. 19 illustrates an example process 1900 for deploying the conveyor mat 102 within a vehicle. At 1902, the personnel may place the conveyor mat assembly 100 onto a vehicle floor, with the flange 306 of the frame 104 an end 1706 of the vehicle floor. At 1904, the personnel may actuate a locking mechanism that causes the conveyor mat 102 to deploy into the vehicle. For example, with the conveyor mat 102 in the retracted state, the personnel may actuate the lever 904 coupled to one of the offset cam locks 902. Rotating the lever 904, for example, may allow the torsional springs 1500 in the conveyor mat 102 to deploy the conveyor mat 102 along the vehicle floor.

At 1906, one or more packages may be placed onto a rolling surface of the conveyor mat 102. For example, the packages may be loaded onto the conveyor mat 102. At 1908, the personnel may slide the packages along the rolling surface. Here, the first rollers 108 and/or the second rollers 110 may form the rolling surface of the conveyor mat 102 and permit the packages to be slid across the rolling surface, into the vehicle. At 1910, the packages may be sorted within the vehicle. For example, the personnel may enter the vehicle and place the packages on shelves within the vehicle. From 1910, the process 1900 may loop to 1906 whereby more packages may be placed onto the conveyor mat 102 for loading into the vehicle.

At 1912, the personnel may actuate the tensioning mechanism to at least partially retract the conveyor mat 102. For example, with the switch 906 engaged, the personnel may pull on the handle 202 to pull the cord 206 through the locking mechanism 900. Being as the cord 206 couples to the conveyor mat 120, pulling on the cord 206 may at least partially retract the conveyor mat 102 into the frame 104. In some instances, this process may repeat until the conveyor mat 102 is fully retracted into the frame 104.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A conveyor mat assembly, comprising:
a frame including a first end and a second end;
a first handle coupled to the frame;
a conveyor mat configured to transition between a retracted state in which the conveyor mat resides between the first end and the second end of the frame, and a deployed state in which the conveyor mat at least partially extends beyond the second end of the frame, the conveyor mat including:
axles disposed along a length of the conveyor mat,
linkages coupled to the axles along the length of the conveyor mat and across a width of the conveyor mat,
supports coupled to the axles along the length of the conveyor mat and across the width of the conveyor mat, and
rollers coupled to the axles along the length of the conveyor mat and across the width of the conveyor mat, the rollers providing a rolling surface for items being transported via the conveyor mat in the deployed state;
torsional springs disposed about the axles and operably coupled to at least a portion of the supports, the torsional springs imparting a force to transition the conveyor mat to the deployed state; and
a tensioning mechanism coupled to the frame proximate to the first end, the tensioning mechanism including:
a second handle,
a spool rotatably engaged with the second handle,
a cord at least partially wound about the spool and coupled to the conveyor mat, and
a locking mechanism configured to engage with the cord to control transitioning of the conveyor mat between the retracted state and the deployed state.

2. The conveyor mat assembly of claim 1, wherein:
the locking mechanism includes two offset cam locks that engage with the cord;
the second handle includes a lever that selectively controls rotation of the second handle;
pulling of the second handle, with the lever actuated, permits a portion of the cord to be pulled through the two offset cam locks; and
releasing the lever permits at least part of the portion of the cord pulled through the two offset cam locks to be wound around the spool.

3. The conveyor mat assembly of claim 1, further comprising coil springs, and wherein:
individual supports of the supports include:
a channel, and
a slot having a top end and a bottom end;
individual axles of the axles are disposed within the slot of the individual supports;
individual coils springs of the coil springs are disposed within the channel, and engage with the individual axles, the individual coil springs biasing the individual axles towards the top end of the individual slots; and
the individual coil springs are compressible upon application of a predetermined amount of force such that the individual axles of the axles are configured to transition to the bottom end of the individual slots.

4. The conveyor mat assembly of claim 1, wherein:
the frame includes a first side and a second side;
the first side includes a first wheel that engages with at least one of:
a first portion of the rollers along a third side of the conveyor mat, or
a first portion of the linkages along the third side of the conveyor mat;
the second side includes a second wheel that engages with at least one of:
a second portion of the rollers along a fourth side of the conveyor mat, or
a second portion of the linkages along the fourth side of the conveyor mat;
the first handle couples to at least one of the first side or the second side;
a flange extends from the first end for engaging with a vehicle; and
at least one of the axles couples to the frame, proximate to the first end.

5. An assembly comprising:
a frame;
a conveyor mat configured to transition between a retracted state in which the conveyor mat is disposed within a footprint of the frame, and a deployed state in which the conveyor mat is disposed at least partially outside the footprint of the frame, the conveyor mat including:
a plurality of linkages,
a plurality of rollers,
a plurality of supports, and
a plurality of axles, wherein individual axles of the plurality of axles couple to individual linkages of the plurality of linkages, individual rollers of the plurality of rollers, and individual supports of the plurality of supports such that the plurality of linkages, the plurality of rollers, and the plurality of supports are coupled together; and
a tensioning system configured to control the conveyor mat transitioning between the retracted state and the deployed state.

6. The assembly of claim 5, wherein the tensioning system includes:
a handle;
a spool;
a cord coupled to the conveyor mat and the spool; and
a locking mechanism configured to engage and disengage the cord, wherein the locking mechanism disengages with the cord to allow the conveyor mat to transition to the deployed state, and the locking mechanism engages the cord to restrict the conveyor mat transitioning to the deployed state.

7. The assembly of claim 6, wherein:
the locking mechanism includes a first offset cam lock and a second offset cam lock; and
at least one of the first offset cam lock or the second offset cam lock is configured to be biased at least partially to disengage with the cord.

8. The assembly of claim 6, wherein:
the handle includes a lever that selectively controls rotation of the spool;
pulling of the handle, with the lever actuated, permits a portion of the cord to be pulled through the locking mechanism; and
releasing the lever permits at least part of the portion of the cord to be wound around the spool, while the locking mechanism engages the cord to restrict the conveyor mat transitioning to the deployed state.

9. The assembly of claim 5, wherein:
the frame includes a first end and a second end;
the tensioning system couples to frame, proximate to the first end;

the conveyor mat at least partially extends beyond the second end in the deployed state; and at least one of the axles couples to the frame, proximate to the first end.

10. The assembly of claim 9, wherein:

the frame includes a first side and a second side;

the first side includes a first wheel that engages with at least one of:
- a first portion of the plurality of rollers along a third side of the conveyor mat, or
- a first portion of the plurality of linkages along the third side of the conveyor mat; and the second side includes a second wheel that engages with at least one of:
- a second portion of the plurality of rollers along a fourth side of the conveyor mat, or
- a second portion of the plurality of linkages along the fourth side of the conveyor mat.

11. The assembly of claim 5, wherein:

the conveyor mat includes a proximal end and a distal end;

the proximal end couples to the frame;

a pedal couples to the distal end; and in the deployed state, a portion of the conveyor mat proximate to the distal end is configured to retract via advancing the pedal in a direction towards the frame.

12. The assembly of claim 5, further comprising coil springs, and wherein:

the individual supports of the supports include:
- a channel, and
- a slot having a top end and a bottom end;

the individual axles are disposed within the slot of the individual supports;

individual coil springs of the coil springs are disposed within the channel of the individual supports, and engage with the individual axles, the individual coil springs biasing the individual axles towards the top end of the slot of the individual supports; and the individual coil springs are compressible upon application of a predetermined amount of force such that the individual axles are configured to transition to the bottom end of the slot of the individual supports.

13. The assembly of claim 5, further comprising torsional springs disposed about the individual axles and operably coupled to the at least a portion of the individual supports, the torsional springs imparting a force to transition the conveyor mat to the deployed state.

14. The assembly of claim 13, wherein at least a portion of the individual supports include:

a recess configured to receive a portion of a body of individual torsional springs; and an arm extending from the recess, the arm being configured to receive a prong of the individual torsional springs.

15. The assembly of claim 13, wherein:

the conveyor mat includes a length having a first portion, a second portion, and a third portion;

the torsional springs include:
- first torsional springs having a first spring constant,
- second torsional springs having a second spring constant less than the first spring constant, and
- third torsional springs having a third spring constant less than the first spring constant;

the first torsional springs are disposed along the first portion of the length;

the second torsional springs are disposed along the second portion of the length; and the third torsional springs are disposed along the third portion of the length.

16. An apparatus, comprising:

a frame including a first end and a second end;

a conveyor mat including a proximal end coupled to the frame and a distal end spaced apart from the proximal end, the conveyor mat being configured to transition between a retracted state in which the distal end of the conveyor mat is located between the first end and a second end, and a deployed state in which distal end of the conveyor mat extends beyond the second end of the frame; and a tensioning system including:
- a handle,
- a spool,
- a cord at least partially wound about the spool and coupled to the conveyor mat, proximate to the distal end, and
- a locking mechanism configured to disengage with the cord to permit the conveyor mat transitioning to the deployed state, and engage with the cord to prevent the conveyor mat transitioning to the deployed state.

17. The apparatus of claim 16, wherein:

the handle includes a lever that selectively controls rotation of the spool;

pulling of the handle, with the lever actuated, permits a portion of the cord to be pulled through the locking mechanism; and releasing the lever permits at least part of the portion of the cord to be pulled through the locking mechanism and wound around the spool.

18. The apparatus of claim 16, wherein:

the conveyor mat includes:
- supports,
- linkages,
- rollers, and
- axles;

individual axles of the axles couple to individual supports of the supports, individual linkages of the linkages, and individual rollers of the rollers along a length of the conveyor mat; and the individual supports of the supports, the individual linkages of the linkages, and the individual rollers of the rollers are disposed on the individual axles of the axles across a width of the conveyor mat.

19. The apparatus of claim 18, further comprising springs, and wherein:

the individual supports include:
- a channel, and
- a slot having a top end and a bottom end;

the individual axles of the axles are disposed within the slot of the individual supports;

individual springs of the springs are disposed within the channel of the individual supports, and engage with the individual axles, the individual springs biasing the individual axles towards the top end of the individual slots; and the individual springs are compressible upon application of a predetermined amount of force such that the individual axles are configured to transition to the bottom end of the individual slots.

20. The apparatus of claim 18, further comprising torsional springs disposed about the individual axles and operably couple to the at least a portion of the individual supports, the torsional springs imparting a force to transition the conveyor mat to the deployed state.

\* \* \* \* \*